US006714907B2

(12) United States Patent
Gao

(10) Patent No.: US 6,714,907 B2
(45) Date of Patent: Mar. 30, 2004

(54) CODEBOOK STRUCTURE AND SEARCH FOR SPEECH CODING

(75) Inventor: Yang Gao, Mission Viejo, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 340 days.

(21) Appl. No.: 09/785,360

(22) Filed: Feb. 15, 2001

(65) Prior Publication Data

US 2002/0007269 A1 Jan. 17, 2002

Related U.S. Application Data

(63) Continuation-in-part of application No. 09/663,242, filed on Sep. 15, 2000, which is a continuation-in-part of application No. 09/156,814, filed on Sep. 18, 1998, now Pat. No. 6,173,257.

(60) Provisional application No. 60/097,569, filed on Aug. 24, 1998.

(51) Int. Cl.[7] .................... G10L 19/14; G10L 19/02; G10L 15/10

(52) U.S. Cl. .................... 704/220; 704/212; 704/223; 704/236; 704/203; 704/204

(58) Field of Search .................... 704/200, 200.1, 704/211, 216, 219, 223, 230, 258, 220, 212, 236, 203, 204

(56) References Cited

U.S. PATENT DOCUMENTS

| | | | | | |
|---|---|---|---|---|---|
| 4,868,867 | A | * | 9/1989 | Davidson et al. | 704/200.1 |
| 5,323,486 | A | | 6/1994 | Taniguchi et al. | |
| 5,701,392 | A | * | 12/1997 | Adoul et al. | 704/219 |
| 5,717,825 | A | | 2/1998 | Lamblin | |
| 5,751,901 | A | * | 5/1998 | DeJaco et al. | 704/216 |
| 5,754,976 | A | * | 5/1998 | Adoul et al. | 704/223 |
| 5,924,062 | A | * | 7/1999 | Maung | 704/219 |
| 5,963,896 | A | * | 10/1999 | Ozawa | 704/219 |
| 6,073,100 | A | * | 6/2000 | Goodridge, Jr. | 704/258 |
| 6,141,638 | A | * | 10/2000 | Peng et al. | 704/211 |
| 6,173,257 | B1 | | 1/2001 | Gao | |
| 6,188,980 | B1 | * | 2/2001 | Thyssen | 704/230 |
| 6,470,313 | B1 | * | 10/2002 | Ojala | 704/223 |
| 2003/0046066 | A1 | * | 3/2003 | Kandhadai et al. | 704/216 |

FOREIGN PATENT DOCUMENTS

| | | |
|---|---|---|
| EP | 0516439 | 12/1992 |
| EP | 0577488 | 1/1994 |
| EP | 0596847 | 5/1994 |
| EP | 0751496 | 1/1997 |

OTHER PUBLICATIONS

Ancin et al ("A Hybrid Wavelet–Binary Pulse Excitation Approach for High Quality CELP Speech Coding", Colloquium on Techniques for Speech Processing and their Application, Jun. 1994).*

(List continued on next page.)

*Primary Examiner*—Richemond Dorvil
*Assistant Examiner*—Daniel A. Nolan
(74) *Attorney, Agent, or Firm*—Farjami & Farjami LLP

(57) ABSTRACT

A speech compression system with a special fixed codebook structure and a new search routine is proposed for speech coding. The system is capable of encoding a speech signal into a bitstream for subsequent decoding to generate synthesized speech. The codebook structure uses a plurality of subcodebooks. Each subcodebook is designed to fit a specific group of speech signals. A better way is used to calculate a criterion value, minimizing an error signal in a minimization loop as part of the coding system. An external signal sets a maximum bitstream rate for delivering encoded speech into a communications system. The speech compression system comprises a full-rate codec, a half-rate codec, a quarter-rate codec and an eighth-rate codec. Each codec is selectively activated to encode and decode the speech signals at different bit rates to enhance overall quality of the synthesized speech at a limited average bit rate.

34 Claims, 14 Drawing Sheets

OTHER PUBLICATIONS

Kataoka et al ("A 6.4 kbit/s Extension to the G.729 Speech Coder", Workshop on Speech Coding For Telecommunications Proceedings, Sep. 1997).*

Kataoka et al "Improved CS–CELP Speech Coding In A Noisy Environment Using A Trained Sparse Conjugate Codebook", International Conference on Acoustics, Speech, and Signal Processing, May 1995).*

Database Inspec 'Online! Institute of Electrical Engineers, Stevenage, GB Kim et al.: "Complexity reduction methods for vector sum excited linear prediction coding" Database accession No. 5027941 XP002126377 & Proceedings of 1994 International Conference on Spoken Language Processing (ICSLP '94), vol. 4, Sep. 18–22, 1994, pp. 2071–2074 Yokohama, JP.

Berouti M et al.: "Efficient computation and encoding of the multipulse excitation for LPC" International Conference on Acoustics, Speech & Signal Processing, ICASSP. San Diego, Mar. 19–21, 1984 New York, IEEE, US, vol. 1 Conf. 9, Mar. 19, 1984 (1984–03–19), pp. 10101–10104, XP002083781 paragraph '02.1! paragraph '05.1!.

Salami R A et al: "Performance of Error Protected Binary Pulse Excitation Coders at 11.4 KB/S Over Mobile Radio Channels" Speech Processing 1. Albuquerque, Apr. 3–6, 1990, International Conference on Acoustics, Speech & Signal Processing. ICASSP, New York, IEEE, US, vol. 1 Conf. 15, Apr. 3, 1990 (1990–04–03), pp. 473–476, XP000146508 paragraph '0002!.

A. Kataoka, S. Hosaka, J. Ikedo, T. Moriya & S. Hayashi, "Improved CS–CELP Speech Coding in a Noisy Environment using a Trained Sparse Conjugate Codebook", 1995 International Conference on Acoustics, Speech & Signal Processing, May 1995.*

A. Chmielewski, J. Domaszewicz, J. Milek, "Real Time Implementation of Forward Gain–Adaptive Vector Quantizer," 8th European Conference Proceedings on Electrotechnics, 1988 & Conference Proceedings on Area Communication, EUROCON '88, Jun. 1988.*

Sridha Sridhan & John Leis, "Two Novel Lossless Algorithms to Exploit Index Redundancy in VQ Speech Compression," Proceedings of the 1998 IEEE International Conference on Acoustics, Speech and Signal Processing, May 1998.*

W. Bastiaan Kleijn and Peter Kroon, "The RCELP Speech–Coding Algorithm," vol. 5, No. 5, Sep.–Oct. 1994, pp. 39/573–47/581.

C. Laflamme, J–P. Adoul, H.Y. Su, and S. Morissette, "On Reducing Computational Complexity of Codebook Search in CELP Coder Through the Use of Algebraic Codes," 1990, pp. 177–180.

Chih–Chung Kuo, Fu–Rong Jean, and Hsiao–Chuan Wang, "Speech Classification Embedded in Adaptive Codebook Search for Low Bit–Rate CELP Coding," IEEE Transactions on Speech and Audio Processing, vol. 3, No. 1, Jan. 1995, p. 1–5.

Erdal Paksoy, Alan McCree, and Vish Viswanathan, "A Variable–Rate Multimodal Speech Coder with Gain–Matched Analysis–By–Synthesis," 1997, pp. 751–754.

Gerhard Schroeder, "International Telecommunication Union Telecommunications Standardization Sector," Jun. 1995, pp. i–iv, 1–42.

Digital Cellular Telecommunications System; Comfort Noise Aspects for Enhanced Full Rate (EFR) Speech Traffic Channels (GSM 06.62),38 May 1996, pp. 1–16.

W. B. Kleijn and K.K. Paliwal (Editors), Speech Coding and Synthesis, Elsevier Science B.V.; Kroon and W.B. Kleijn (Authors), Chapter 3: "Linear–Prediction Based on Analysis–by–Synthesis Coding", 1995, pp. 81–113.

W.B. Kleijn and K.K. Paliwal (Editors), Speech Coding and Synthesis, Elsevier Science B.V.; A. Das, E. Paskoy and A. Gersho (Authors), Chapter 7: "Multimode and Variable–Rate Coding of Speech," 1995, pp. 257–288.

B.S. Atal, V. Cuperman, and A. Gersho (Editors), Speech and Audio Coding for Wireless and Network Applications, Kluwer Academic Publishers; T. Taniguchi, Y. Tanaka and Y. Ohta (Authors), Chapter 27: "Structured Stochastic Codebook and Codebook Adaptation for CELP," 1993, pp. 217–224.

B.S. Atal, Cuperman, and A. Gersho (Editor), Advances in Speech Coding, Kluwer Academic Publishers; I. A. Gerson and M.A. Jasiuk (Authors), Chapter 7: "Vector Sum Excited Linear Prediction (VSELP)," 1991, pp. 69–79.

B.S. Atal, V. Cuperman, and A. Gersho (Editors), Advances in Speech Coding, Kluwer Academic Publishers; J. P. Campbell, Jr., T.E. Tremain, and V.C. Welch (Authors), Chapter 12: "The DOD 4.8 KBPS Standard (Proposed Federal Standard 1016)," 1991, pp. 121–133.

B.S. Atal, V. Cuperman, And A. Gersho (Editors), Advances in Speech Coding, Kluwer Academic Publishers; R.A. Salami (Author), Chapter 14: "Binary Pulse Excitation: A Novel Approach to Low Complexity CELP Coding," 1991, pp. 145–157.

* cited by examiner 3 sign bits, 4 bits, 4, bits, 3 bits, 4 bits, 3 bits

Subcodebook #1,
full rate codec, type 0, 5-pulse subcodebook

1 + 3 bits, 1 + 3 bits, 1+ 3 bits, 1 + 3 bits, 1 + 3 bits

Subcodebook #2,
full rate codec, type 0, 5-pulse subcodebook

1 + 3 bits, 1 + 3 bits, 1+ 3 bits, 1 + 3 bits, 1 + 3 bits

Subcodebook #3,
full rate codec, type 0, 5-pulse subcodebook

Subcodebook #1,
half rate codec, type 0, 2-pulse subcodebook

Subcodebook #2,
half rate codec, type 0, 3-pulse subcodebook

Subcodebook #3,
half rate codec, type 0, Gaussian subcodebook

Subcodebook #1,
full rate codec, type 1, 8-pulse subcodebook

Subcodebook #1,
half rate codec, type 1, 2-pulse subcodebook

Subcodebook #2,
half rate codec, type 1, 3-pulse subcodebook

Subcodebook #3,
half rate codec, type 1, 5-pulse subcodebook

CODEBOOK STRUCTURE AND SEARCH FOR SPEECH CODING

CROSS REFERENCE TO RELATED APPLICATION

This application is a continuation-in-part of application Ser. No. 09/663,242, filed Sep. 15, 2000, entitled Codebook Structure and Search for Speech Coding, which is a continuation-in-part of application Ser. No. 09/156,814, filed Sep. 18, 1998, now U.S. Pat. No. 6,173,257 entitled Completed Fixed Codebook for Speech Coder, and assigned to the assignee of this invention, the disclosure of which is incorporated by reference. The following applications are incorporated by reference in their entirety and made part of this application:

U.S. Provisional Application Ser. No. 60/097,569, entitled "Adaptive Rate Speech Codec," filed Aug. 24, 1998;

U.S. patent application Ser. No. 09/154,675, entitled "Speech Encoder Using Continuous Warping In Long Term Preprocessing," filed Sep. 18, 1998;

U.S. patent application Ser. No. 09/156,649, entitled "Comb Codebook Structure," filed Sep. 18, 1998;

U.S. patent application Ser. No. 09/156,648, entitled "Low Complexity Random Codebook Structure," filed Sep. 18, 1998;

U.S. patent application Ser. No. 09/156,650, entitled "Speech Encoder Using Gain Normalization That Combines Open And Closed Loop Gains," filed Sep. 18, 1998;

U.S. patent application Ser. No. 09/156,832, entitled "Speech Encoder Using Voice Activity Detection In Coding Noise," filed Sep. 18, 1998;

U.S. patent application Ser. No. 09/154,654, entitled "Pitch Determination Using Speech Classification And Prior Pitch Estimation," filed Sep. 18, 1998;

U.S. patent application Ser. No. 09/154,657, entitled "Speech Encoder Using A Classifier For Smoothing Noise Coding," filed Sep. 18, 1998;

U.S. patent application Ser. No. 09/156,826, entitled "Adaptive Tilt Compensation For Synthesized Speech Residual," filed Sep. 18, 1998;

U.S. patent application Ser. No. 09/154,662, entitled "Speech Classification And Parameter Weighting Used In Codebook Search," filed Sep. 18, 1998;

U.S. patent application Ser. No. 09/154,653, entitled "Synchronized Encoder-Decoder Frame Concealment Using Speech Coding Parameters," filed Sep. 18, 1998;

U.S. patent application Ser. No. 09/154,663, entitled "Adaptive Gain Reduction To Produce Fixed Codebook Target Signal," filed Sep. 18, 1998;

U.S. patent application Ser. No. 09/154,660, entitled "Speech Encoder Adaptively Applying Pitch Long-Term Prediction and Pitch Preprocessing With Continuous Warping," filed Sep. 18, 1998.

The following U.S. patent applications relate to and further describe other aspects of the embodiments disclosed in this application and are incorporated by reference in their entirety.

U. S. patent application Ser. No. 60/233,043, "INJECTING HIGH FREQUENCY NOISE INTO PULSE EXCITATION FOR LOW BIT RATE CELP," Attorney Reference Number: 00CXT0065D (10508.5), filed on Sep. 15, 2000.

U.S. patent application Ser. No. 60/232,939, "SHORT TERM ENHANCEMENT IN CELP SPEECH CODING," Attorney Reference Number: 00CXT0666N (10508.6), filed on Sep. 15, 2000.

U.S. patent application Ser. No. 60/233,045, "SYSTEM OF DYNAMIC PULSE POSITION TRACKS FOR PULSE-LIKE EXCITATION IN SPEECH CODING," Attorney Reference Number: 00CXT0573N (10508.7), filed on Sep. 15, 2000.

U.S. patent application Ser. No. 60/232,958, "SPEECH CODING SYSTEM WITH TIME-DOMAIN NOISE ATTENUATION," Attorney Reference Number: 00CXT0554N (10508.8), filed on Sep. 15, 2000.

U.S. patent application Ser. No. 60/233,042, "SYSTEM FOR AN ADAPTIVE EXCITATION PATTERN FOR SPEECH CODING," Attorney Reference Number: 98RSS366 (10508.9), filed on Sep. 15, 2000.

U.S. patent application Ser. No. 60/233,046, "SYSTEM FOR ENCODING SPEECH INFORMATION USING AN ADAPTIVE CODEBOOK WITH DIFFERENT RESOLUTION LEVELS," Attorney Reference Number: 00CXT0670N (10508.13), filed on Sep. 15, 2000.

U.S. patent application Ser. No. 09/663,837, "CODEBOOK TABLES FOR ENCODING AND DECODING," Attorney Reference Number: 00CXT0669N (10508.14), filed on Sep. 15, 2000, and is now U.S. Pat. No. 6,574,593.

U.S. patent application Ser. No. 09/662,828, "BIT STREAM PROTOCOL FOR TRANSMISSION OF ENCODED VOICE SIGNALS," Attorney Reference Number: 00CXT0668N (10508.15), filed on Sep. 15, 2000, and is now U.S. Pat. No. 6,581,032.

U.S. patent application Ser. No. 60/233,044, "SYSTEM FOR FILTERING SPECTRAL CONTENT OF A SIGNAL FOR SPEECH ENCODING," Attorney Reference Number: 00CXT0667N (10508.16), filed on Sep. 15, 2000.

U.S. patent application Ser. No. 09/663,734, "SYSTEM FOR ENCODING AND DECODING SPEECH SIGNALS," Attorney Reference Number: 00CXT0665N (10508.17), filed on Sep. 15, 2000, and is now U.S. Pat. No. 6,604,070.

U.S. patent application Ser. No. 09/663,002, "SYSTEM FOR SPEECH ENCODING HAVING AN ADAPTIVE FRAME ARRANGEMENT," Attorney Reference Number: 98RSS384CIP (10508.18), filed on Sep. 15, 2000.

U.S. patent application Ser. No. 60/232,938, "SYSTEM FOR IMPROVED USE OF PITCH ENHANCEMENT WITH SUBCODEBOOKS," Attorney Reference Number: 00CXT0569N (10508.19), filed on Sep. 15, 2000.

BACKGROUND OF THE INVENTION

1. Technical Field

This invention relates to speech communication systems and, more particularly, to systems and methods for digital speech coding.

2. Related Art

One prevalent mode of human communication involves the use of communication systems. Communication systems include both wireline and wireless radio systems. Wireless communication systems electrically connect with the landline systems and communicate using radio frequency (RF) with mobile communication devices. Currently, the radio frequencies available for communication in cellular systems, for example, are in the frequency range centered around 900 MHz and in the personal communication services (PCS) frequency range centered around 1900 MHz. Due to increased traffic caused by the expanding popularity of wireless communication devices, such as cellular telephones, it is desirable to reduce bandwidth of transmissions within the wireless systems.

Digital transmission in wireless radio telecommunications is increasingly being applied to both voice and data due to noise immunity, reliability, compactness of equipment and the ability to implement sophisticated signal processing functions using digital techniques. Digital transmission of speech signals involves the steps of: sampling an analog speech waveform with an analog-to-digital converter, speech compression (encoding), transmission, speech decompression (decoding), digital-to-analog conversion, and playback into an earpiece or a loudspeaker. The sampling of the analog speech waveform with the analog-to-digital converter creates a digital signal. However, the number of bits used in the digital signal to represent the analog speech waveform creates a relatively large bandwidth. For example, a speech signal that is sampled at a rate of 8000 Hz (once every 0.125 ms), where each sample is represented by 16 bits, will result in a bit rate of 128,000 (16×8000) bits per second, or 128 kbps (kilo bits per second).

Speech compression reduces the number of bits that represent the speech signal, thus reducing the bandwidth needed for transmission. However, speech compression may result in degradation of the quality of decompressed speech. In general, a higher bit rate will result in higher quality, while a lower bit rate will result in lower quality. However, speech compression techniques, such as coding techniques, can produce decompressed speech of relatively high quality at relatively low bit rates. In general, low bit rate coding techniques attempt to represent the perceptually important features of the speech signal, with or without preserving the actual speech waveform.

Typically, parts of the speech signal for which adequate perceptual representation is more difficult or more important (such as voiced speech, plosives or voice onsets) are coded and transmitted using a higher number of bits. Parts of the speech signal for which adequate perceptual representation is less difficult or less important (such as unvoiced, or the silence between words) are coded with a lower number of bits. The resulting average bit rate for the speech signal will be relatively lower than would be the case for a fixed bit rate that provides decompressed speech of similar quality.

These speech compression techniques have resulted in lowering the amount of bandwidth used to transmit a speech signal. However, further reduction in bandwidth is important in a communication system for a large number of users. Accordingly, there is a need for systems and methods of speech coding that are capable of minimizing the average bit rate needed for speech representation, while providing high quality decompressed speech.

SUMMARY

The invention provides a way to construct an efficient codebook structure and a fast search approach, which in one example are used in a Selectable Mode Vocoder ("SMV") system. The SMV system varies the encoding and decoding rates in a communications device, such as a mobile telephone, a cellular telephone, a portable radio transceiver or other wireless or wire line communication device. The disclosed embodiments describe a system for varying the rates and associated bandwidth in accordance with an signal from an external source, such as the communication system with which the mobile device interacts. In various embodiments, the communications system selects a mode for the communications equipment using the system, and speech is processed according to that mode.

One embodiment of a speech compression system includes a full-rate codec, a half-rate codec, a quarter-rate codec and an eighth-rate codec each capable of encoding and decoding speech signals. The speech compression system performs a rate selection on a frame by frame basis of a speech signal to select one of the codecs. The speech compression system then utilizes a fixed codebook structure with a plurality of subcodebooks. A search routine selects a best codevector from among the codebooks in encoding and decoding the speech. The search routine is based on minimizing an error function in an iterative fashion.

Accordingly, the speech coder is capable of selectively activating the codecs to maximize the overall quality of a reconstructed speech signal while maintaining the desired average bit rate. Other systems, methods, features and advantages of the invention will be or will become apparent to one with skill in the art upon examination of the following figures and detailed description. It is intended that all such additional systems, methods, features and advantages included within this description be within the scope of the invention, and be protected by the accompanying claims.

BRIEF DESCRIPTION OF THE FIGURES

The components in the figures are not necessarily to scale, emphasis instead being placed upon illustrating the principals of the invention. Moreover, in the figures, like reference numerals designate corresponding parts throughout the different views.

DETAILED DESCRIPTION OF THE PREFERRED EMBODIMENTS

Speech compression systems (codecs) include an encoder and a decoder and may be used to reduce the bit rate of digital speech signals. Numerous algorithms have been developed for speech codecs that reduce the number of bits required to digitally encode the original speech while attempting to maintain high quality reconstructed speech. Code-Excited Linear Predictive (CELP) coding techniques, as discussed in the article entitled "Code-Excited Linear Prediction: High-Quality Speech at Very Low Rates," by M. R. Schroeder and B. S. Atal, Proc. ICASSP-85, pages 937–940, 1985, provide one effective speech coding algorithm. An example of a variable rate CELP based speech coder is TIA (Telecommunications Industry Association) IS-127 standard that is designed for CDMA (Code Division Multiple Access) applications. The CELP coding technique utilizes several prediction techniques to remove the redundancy from the speech signal. The CELP coding approach stores sampled input speech signals into blocks of samples called frames. The frames of data may then be processed to create a compressed speech signal in digital form. Other embodiments may include subframe processing as well as, or in lieu of, frame processing.

Figure 1:
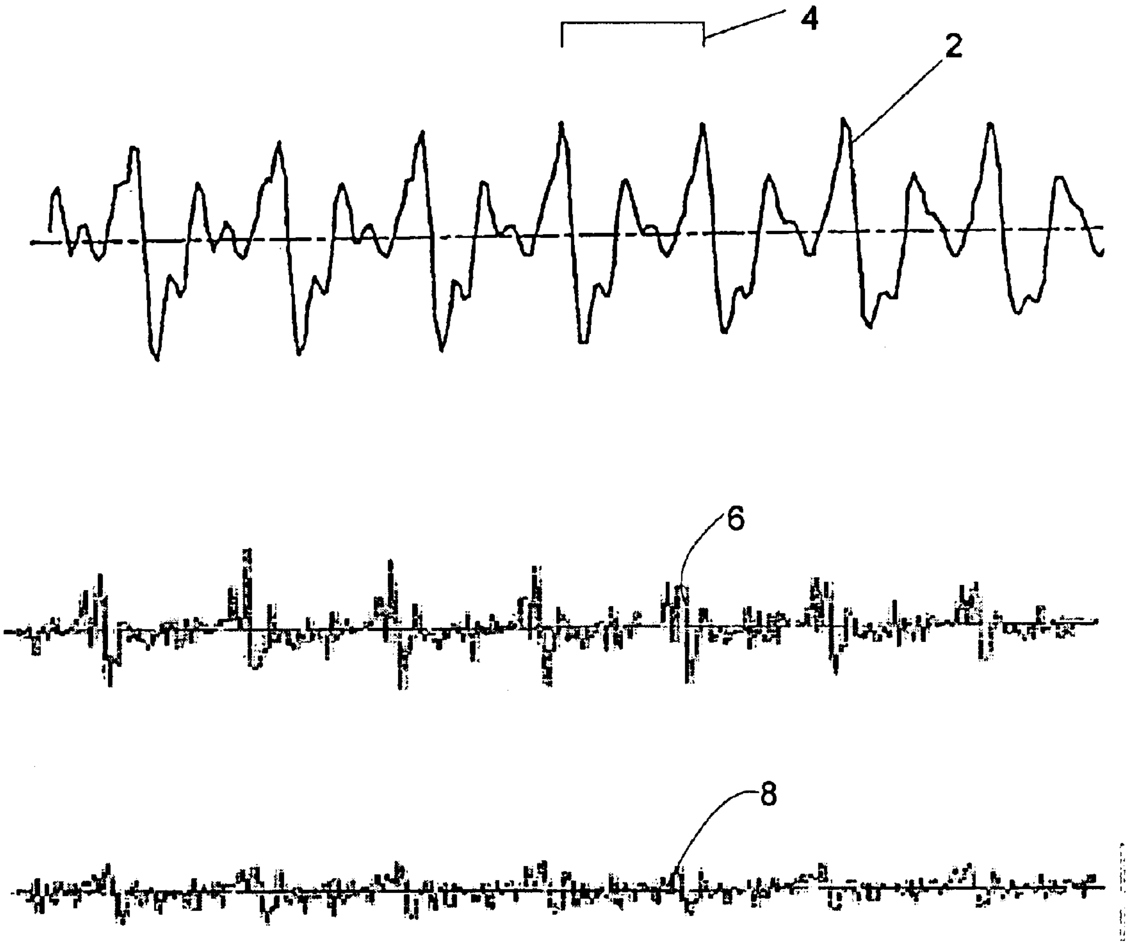
FIG. 1 is a graphical representation of speech patterns over a time period.

FIG. 1 depicts the waveforms used in CELP speech coding. An input speech signal 2 has some measure of predictability or periodicity 4. The CELP coding approach uses two types of predictors, a short-term predictor and a long-term predictor. The short-term predictor is typically applied before the long-term predictor. A prediction error derived from the short-term predictor is called short-term residual, and a prediction error derived from the long-term predictor is called long-term residual. Using CELP coding, a first prediction error is called a short-term or LPC residual 6. A second prediction error is called a pitch residual 8.

The long-term residual may be coded using a fixed codebook that includes a plurality of fixed codebook entries or vectors. One of the entries may be selected and multiplied by a fixed codebook gain to represent the long-term residual. Lag and gain parameters may also be calculated from an adaptive codebook and used to code or decode speech. The short-term predictor may also be referred to as an LPC (Linear Prediction Coding) or a spectral envelope representation and typically comprises 10 prediction parameters. Each lag parameter may also be called a pitch lag, and each long-term predictor gain parameter can also be called an adaptive codebook gain. The lag parameter defines an entry or a vector in the adaptive codebook.

The CELP encoder performs an LPC analysis to determine the short-term predictor parameters. Following the LPC analysis, the long-term predictor parameters may be determined. In addition, determination of the fixed codebook entry and the fixed codebook gain that best represent the long-term residual occurs. Analysis-by-synthesis (ABS), that is, feedback, is employed in CELP coding. In the ABS approach, the contribution from the fixed codebook, the fixed codebook gain, and the long-term predictor parameters may be found by synthesizing using an inverse prediction filter and applying a perceptual weighting measure. The short-term (LPC) prediction coefficients, the fixed-codebook gain, as well as the lag parameter and the long-term gain parameter may then be quantized. The quantization indices, as well as the fixed codebook indices, may be sent from the encoder to the decoder.

The CELP decoder uses the fixed codebook indices to extract a vector from the fixed codebook. The vector may be multiplied by the fixed-codebook gain, to create a fixed codebook contribution. A long-term predictor contribution may be added to the fixed codebook contribution to create a synthesized excitation that is referred to as an excitation. The long-term predictor contribution comprises the excitation from the past multiplied by the long-term predictor gain. The addition of the long-term predictor contribution alternatively can be viewed as an adaptive codebook contribution or as a long-term (pitch) filtering. The short-term excitation may be passed through a short-term inverse prediction filter (LPC) that uses the short-term (LPC) prediction coefficients quantized by the encoder to generate synthesized speech. The synthesized speech may then be passed through a post-filter that reduces perceptual coding noise.

Figure 2:
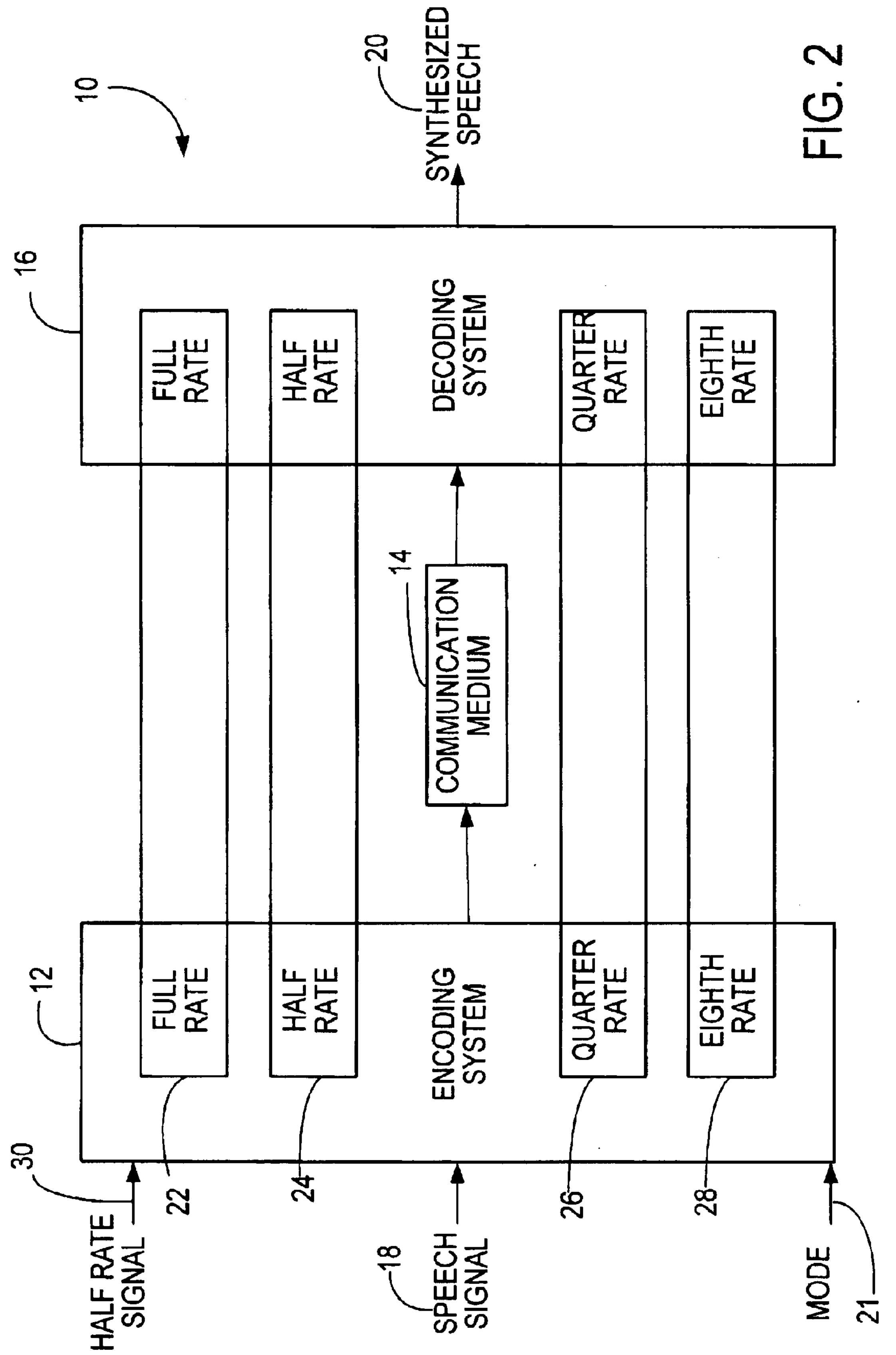
FIG. 2 is a block diagram of one embodiment of a speech encoding system.

FIG. 2 is a block diagram of one embodiment of a speech compression system 10 that may utilize adaptive and fixed codebooks. In particular, the system may utilize fixed codebooks comprising a plurality of subcodebooks for encoding at different rates depending on the mode set by the external signal and the characterization of the speech. The speech compression system 10 includes an encoding system 12, a communication medium 14 and a decoding system 16 that may be connected as illustrated. The speech compression system 10 may be any coding device capable of receiving and encoding a speech signal 18, and then decoding it to create post-processed synthesized speech 20.

The speech compression system 10 operates to receive the speech signal 18. The speech signal 18 emitted by a sender (not shown) can be, for example, captured by a microphone and digitized by the analog-to-digital converter (not shown). The sender may be a human voice, a musical instrument or any other device capable of emitting analog signals.

The encoding system 12 operates to encode the speech signal 18. The encoding system 12 segments the speech signal 18 into frames to generate a bitstream. One embodiment of the speech compression system 10 uses frames that comprise 160 samples that, at a sampling rate of 8000 Hz, correspond to 20 milliseconds per frame. The frames represented by the bitstream may be provided to the communication medium 14.

The communication medium 14 may be any transmission mechanism, such as a communication channel, radio waves, wire transmissions, fiber optic transmissions, or any medium capable of carrying the bitstream generated by the encoding system 12. The communication medium 14 also can be a storage mechanism, such as, a memory device, a storage media or other device capable of storing and retrieving the bitstream generated by the encoding system 12. The communication medium 14 operates to transmit the bitstream generated by the encoding system 12 to the decoding system 16.

The decoding system 16 receives the bitstream from the communication medium 14. The decoding system 16 operates to decode the bitstream and generate the post-processed synthesized speech 20 in the form of a digital signal. The post-processed synthesized speech 20 may then be converted to an analog signal by a digital-to-analog converter (not shown). The analog output of the digital-to-analog converter may be received by a receiver (not shown) that may be a human ear, a magnetic tape recorder, or any other device capable of receiving an analog signal. Alternatively, the post-processed synthesized speech 20 may be received by a digital recording device, a speech recognition device, or any other device capable of receiving a digital signal.

One embodiment of the speech compression system 10 also includes a mode line 21. The Mode line 21 carries a Mode signal that indicates the desired average bit rate for the bitstream. The Mode signal may be generated externally by a system controlling the communication medium, for example, a wireless telecommunication system. The encoding system 12 may determine of which of a plurality of codecs to be activate within the encoding system 12 or how to operate the codec in response to the mode signal.

The codecs comprise an encoder portion and a decoder portion that are located within the encoding system 12 and the decoding system 16, respectively. In one embodiment of the speech compression system 10 there are four codecs, namely: a full-rate codec 22, a half-rate codec 24, a quarter-rate codec 26, and an eighth-rate codec 28. Each of the codecs 22, 24, 26 and 28 is operable to generate the bitstream. The size of the bitstream generated by each codec 22, 24, 26 and 28, and hence the bandwidth needed for its transmission via the communication medium 14 is different.

In one embodiment, the full-rate codec 22, the half-rate codec 24, the quarter-rate codec 26 and the eighth-rate codec 28 generate 170 bits, 80 bits, 40 bits and 16 bits, respectively, per frame. The size of the bitstream of each frame corresponds to a bit rate, namely, 8.5 Kbps for the full-rate codec 22, 4.0 Kbps for the half-rate codec 24, 2.0 Kbps for the quarter-rate codec 26, and 0.8 Kbps for the eighth-rate codec 28. However, fewer or more codecs as well as other bit rates are possible in alternative embodiments. By processing the frames of the speech signal 18 with the various codecs, an average bit rate or bitstream is achieved.

The encoding system 12 determines which of the codecs 22, 24, 26 and 28 may be used to encode a particular frame based on characterization of the frame, and on the desired average bit rate provided by the Mode signal. Characterization of a frame is based on the portion of the speech signal 18 contained in the particular frame. For example, frames may be characterized as stationary voiced, non-stationary voiced, unvoiced, onset, background noise, silence etc.

The Mode signal on the Mode signal line 21 in one embodiment identifies a Mode 0, a Mode 1, and a Mode 2. Each of the three Modes provides a different desired average bit rate for varying the percentage of usage of each of the codecs 22, 24, 26 and 28. Mode 0 may be referred to as a premium mode in which most of the frames may be coded with the full-rate codec 22; fewer of the frames may be coded with the half-rate codec 24; and frames comprising silence and background noise may be coded with the quarter-rate codec 26 and the eighth-rate codec 28. Mode 1 may be referred to as a standard mode in which frames with high information content, such as onset and some voiced frames, may be coded with the full-rate codec 22. In addition, other voiced and unvoiced frames may be coded with the half-rate codec 24, some unvoiced frames may be coded with the quarter-rate codec 26, and silence and stationary background noise frames may be coded with the eighth-rate codec 28.

Mode 2 may be referred to as an economy mode in which only a few frames of high information content may be coded with the full-rate codec 22. Most of the frames in Mode 2 may be coded with the half-rate codec 24 with the exception of some unvoiced frames that may be coded with the quarter-rate codec 26. Silence and stationary background noise frames may be coded with the eighth-rate codec 28 in Mode 2. Accordingly, by varying the selection of the codecs 22, 24, 26 and 28, the speech compression system 10 may deliver reconstructed speech at the desired average bit rate while attempting to maintain the highest possible quality. Additional Modes, such as, a Mode three operating in a super economy Mode or a half-rate max mode in which the maximum codec activated is the half-rate codec 24 are possible in alternative embodiments.

Further control of the speech compression system 10 may also be provided by a half rate signal line 30. The half rate signal line 30 provides a half rate signaling flag. The half rate signaling flag may be provided by an external source such as a wireless telecommunication system. When activated, the half rate signaling flag directs the speech compression system 10 to use the half-rate codec 24 as the maximum rate. In alternative embodiments, the half rate signaling flag directs the speech compression system 10 to use one codec 22, 24, 26 or 28, in place of another or identify a different codec 22, 26 or 28, as the maximum or minimum rate.

In one embodiment of the speech compression system 10, the full and half-rate codecs 22 and 24 may be based on an eX-CELP (extended CELP) approach and the quarter and eighth-rate codecs 26 and 28 may be based on a perceptual matching approach. The eX-CELP approach extends the traditional balance between perceptual matching and waveform matching of traditional CELP. In particular, the eX-CELP approach categorizes the frames using a rate selection and a type classification that will be described later. Within the different categories of frames, different encoding approaches may be utilized that have different perceptual matching, different waveform matching, and different bit assignments. The perceptual matching approach of the quarter-rate codec 26 and the eighth-rate codec 28 do not use waveform matching and instead concentrate on the perceptual aspects when encoding frames.

The rate selection is determined by characterization of each frame of the speech signal, based on the portion of the speech signal contained in the particular frame. For example, frames may be characterized in a number of ways, such as stationary voiced speech, non-stationary voiced speech, unvoiced, background noise, silence, and so on. In addition, the rate selection is influenced by the mode that the speech compression system is using. The codecs are designed to optimize coding within the different characterizations of the speech signals. Optimal coding balances the desire to provide synthesized speech of the highest perceptual quality while maintaining the desired average rate of the bitstream. This allows the maximum use of the available bandwidth. During operation, the speech compression system selectively activates the codecs based on the mode as well as characterization of each frame to optimize the perceptual quality of the speech.

The coding of each frame with either the eX-CELP approach or the perceptual matching approach may be based on further dividing the frame into a plurality of subframes. The subframes may be different in size and in number for each codec 22, 24, 26 and 28, and may vary within a codec. Within the subframes, speech parameters and waveforms may be coded with several predictive and non-predictive scalar and vector quantization techniques. In scalar quantization, a speech parameter or element may be represented by an index location of the closest entry in a representative table of scalars. In vector quantization, several speech parameters may be grouped to form a vector. The vector may be represented by an index location of the closest entry in a representative table of vectors.

In predictive coding, an element may be predicted from the past. The element may be a scalar or a vector. The prediction error may then be quantized, using a table of scalars (scalar quantization) or a table of vectors (vector quantization). The eX-CELP coding approach, similarly to traditional CELP, uses an Analysis-by-Synthesis (ABS) scheme for choosing the best representation for several parameters. In particular, the parameters may be contained within an adaptive codebook or a fixed codebook, or both, and may further comprise gains for both. The ABS scheme uses inverse prediction filters and perceptual weighting measures for selecting the best codebook entries.

Figure 3:
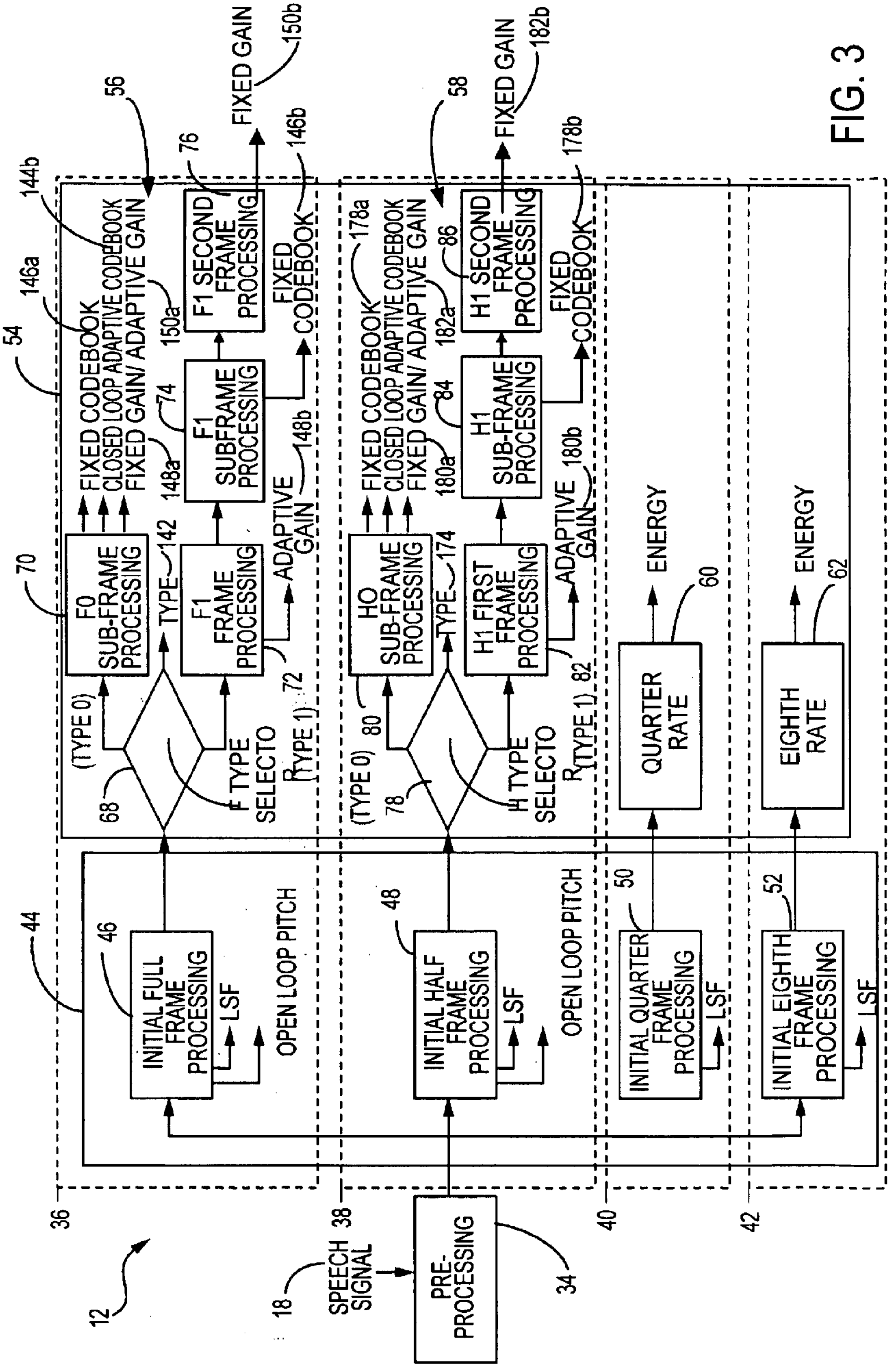
FIG. 3 is an extended block diagram of a speech coding system illustrated in FIG. 2.

FIG. 3 is a more detailed block diagram of the encoding system 12 illustrated in FIG. 2. One embodiment of the encoding system 12 includes a pre-processing module 34, a full-rate encoder 36, a half-rate encoder 38, a quarter-rate encoder 40 and an eighth-rate encoder 42 that may be connected as illustrated. The rate encoders 36, 38, 40 and 42 include an initial frame-processing module 44 and an excitation-processing module 54.

The speech signal 18 received by the encoding system 12 is processed on a frame level by the pre-processing module 34. The pre-processing module 34 is operable to provide initial processing of the speech signal 18. The initial processing can include filtering, signal enhancement, noise removal, amplification and other similar techniques capable of optimizing the speech signal 18 for subsequent encoding.

The full, half, quarter and eighth-rate encoders 36, 38, 40 and 42 are the encoding portion of the full, half, quarter and eighth-rate codecs 22, 24, 26 and 28, respectively. The initial frame-processing module 44 performs initial frame processing, speech parameter extraction and determines which of the rate encoders 36, 38, 40 and 42 will encode a particular frame. The initial frame-processing module 44 may be illustratively sub-divided into a plurality of initial frame processing modules, namely, an initial full frame processing module 46, an initial half frame-processing module 48, an initial quarter frame-processing module 50 and an initial eighth frame-processing module 52. The initial frame-processing module 44 performs common processing to determine a rate selection that activates one of the rate encoders 36, 38, 40 and 42.

In one embodiment, the rate selection is based on the characterization of the frame of the speech signal 18 and the Mode of the speech compression system 10. Activation of one of the rate encoders 36, 38, 40 and 42 correspondingly activates one of the initial frame-processing modules 46, 48, 50 and 52. A particular initial frame-processing module 46, 48, 50 or 52 is activated to encode aspects of the speech signal 18 that are common to the entire frame. The encoding by the initial frame-processing module 44 quantizes parameters of the speech signal 18 contained in a frame. The quantized parameters result in generation of a portion of the bitstream. The module may also make an initial classification as to whether a frame is Type 0 or Type 1, discussed below. The type classification and rate selection may be used to optimize the encoding by portions of the excitation-processing module 54 that correspond to the full and half-rate encoders 36, 38.

One embodiment of the excitation-processing module 54 may be sub-divided into a full-rate module 56, a half-rate module 58, a quarter-rate module 60, and an eighth-rate module 62. The modules 56, 58, 60 and 62 correspond to the encoders 36, 38, 40 and 42. The full and half-rate modules 56 and 58 of one embodiment both include a plurality of frame processing modules and a plurality of subframe processing modules that provide substantially different encoding as will be discussed.

The portion of the excitation processing module 54 for both the full and half-rate encoders 36 and 38 include type selector modules, first subframe processing modules, second subframe processing modules, first frame processing modules and second subframe processing modules. More specifically, the full-rate module 56 includes an F type selector module 68, an F0 subframe processing module 70, an F1 first frame-processing module 72, an F1 second subframe processing module 74 and an F1 second frame-processing module 76. The term "F" indicates full-rate, "H" indicates half-rate, and "0" and "1" signify Type Zero and Type One, respectively. Similarly, the half-rate module 58 includes an H type selector module 78, an H0 subframe processing module 80, an H1 first frame-processing module 82, an H1 subframe processing module 84, and an H1 second frame-processing module 86.

The F and H type selector modules 68 and 78 direct the processing of the speech signals 18 to further optimize the encoding process based on the type classification. Classification as Type 1 indicates the frame contains a harmonic structure and a formant structure that do not change rapidly, such as stationary voiced speech. All other frames may be classified as Type 0, for example, a harmonic structure and a formant structure that changes rapidly, or the frame exhibits stationary unvoiced or noise-like characteristics. The bit allocation for frames classified as Type 0 may be consequently adjusted to better represent and account for this behavior.

Type Zero classification in the full rate module 56 activates the F0 first subframe processing module 70 to process the frame on a subframe basis. The F1 first frame-processing module 72, the F1 subframe processing module 74, and the F1 second frame-processing modules 76 combine to generate a portion of the bitstream when the frame being processed is classified as Type One. Type One classification involves both subframe and frame processing within the full rate module 56.

Similarly, for the half rate module 58, the H0 subframe-processing module 80 generates a portion of the bitstream on a sub-frame basis when the frame being processed is classified as Type Zero. Further, the H1 first frame-processing module 82, the H1 subframe processing module 84, and the H1 second frame-processing module 86 combine to generate a portion of the bitstream when the frame being processed is classified as Type One. As in the full rate module 56, the Type One classification involves both subframe and frame processing.

The quarter and eighth-rate modules 60 and 62 are part of the quarter and eighth-rate encoders 40 and 42, respectively, and do not include the type classification. The type classification is not included due to the nature of the frames that are processed. The quarter and eighth-rate modules 60 and 62 generate a portion of the bitstream on a subframe basis and a frame basis, respectively, when activated.

The rate modules 56, 58, 60 and 62 generate a portion of the bitstream that is assembled with a respective portion of the bitstream that is generated by the initial frame processing modules 46, 48, 50 and 52 to create a digital representation of a frame. For example, the portion of the bitstream generated by the initial full-rate frame-processing module 46 and the full-rate module 56 may be assembled to form the bitstream generated when the full-rate encoder 36 is activated to encode a frame. The bitstreams from each of the encoders 36, 38, 40 and 42 may be further assembled to form a bitstream representing a plurality of frames of the speech signal 18. The bitstream generated by the encoders 36, 38, 40 and 42 is decoded by the decoding system 16.

Figure 4:
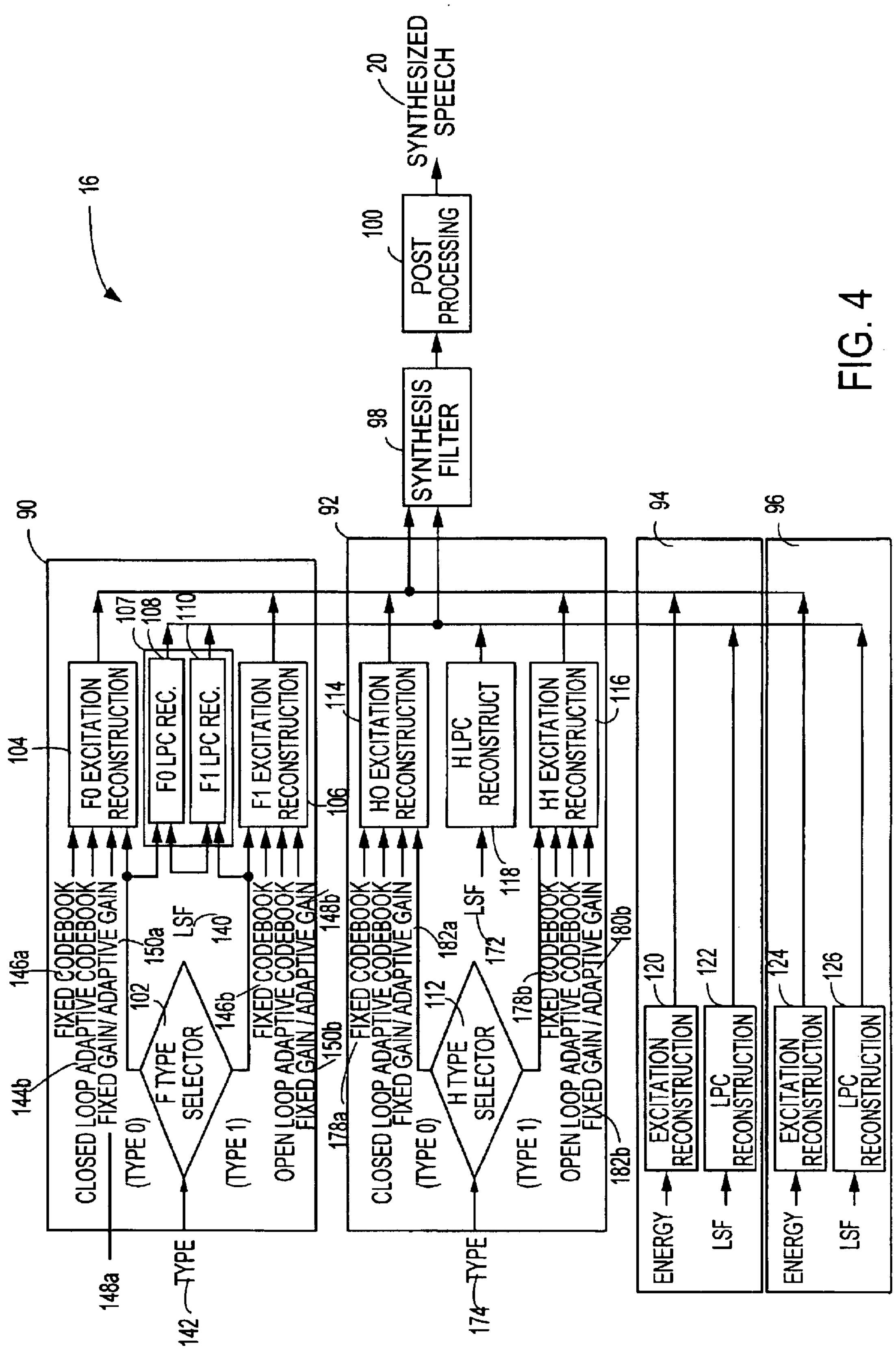
FIG. 4 is an extended block diagram of the decoding system illustrated in FIG. 2.

FIG. 4 is an expanded block diagram of the decoding system 16 illustrated in FIG. 2. One embodiment of the decoding system 16 includes a full-rate decoder 90, a half-rate decoder 92, a quarter-rate decoder 94, an eighth-rate decoder 96, a synthesis filter module 98 and a post-processing module 100. The full, half, quarter and eighth-rate decoders 90, 92, 94 and 96, the synthesis filter module 98 and the post-processing module 100 are the decoding portion of the full, half, quarter and eighth-rate codecs 22, 24, 26 and 28.

The decoders 90, 92, 94 and 96 receive the bitstream and decode the digital signal to reconstruct different parameters of the speech signal 18. The decoders 90, 92, 94 and 96 may be activated to decode each frame based on the rate selection. The rate selection may be provided from the encoding system 12 to the decoding system 16 by a separate information transmittal mechanism, such as a control channel in a wireless telecommunication system. Alternatively, the rate selection is included within the transmission of the encoded speech (since each frame is coded separately) or is transmitted from an external source.

The synthesis filter 98 and the post-processing module 100 are part of the decoding process for each of the decoders 90, 92, 94 and 96. Assembling the parameters of the speech signal 18 that are decoded by the decoders 90, 92, 94 and 96 using the synthesis filter 98, generates unfiltered synthesized speech. The unfiltered synthesized speech is passed through the post-processing module 100 to create the post-processed synthesized speech 20.

One embodiment of the full-rate decoder 90 includes an F type selector 102 and a plurality of excitation reconstruction modules. The excitation reconstruction modules comprise an F0 excitation reconstruction module 104 and an F1 excitation reconstruction module 106. In addition, the full-rate decoder 90 includes a linear prediction coefficient (LPC) reconstruction module 107. The LPC reconstruction module 107 comprises an F0 LPC reconstruction module 108 and an F1 LPC reconstruction module 110.

Similarly, one embodiment of the half-rate decoder 92 includes an H type selector 112 and a plurality of excitation reconstruction modules. The excitation reconstruction modules comprise an H0 excitation reconstruction module 114 and an H1 excitation reconstruction module 116. In addition, the half-rate decoder 92 comprises a linear prediction coefficient (LPC) reconstruction module that is an H LPC reconstruction module 118. Although similar in concept, the full and half-rate decoders 90 and 92 are designated to decode bitstreams from the corresponding full and half-rate encoders 36 and 38, respectively.

The F and H type selectors 102 and 112 selectively activate respective portions of the full and half-rate decoders 90 and 92 depending on the type classification. When the type classification is Type Zero, the F0 or H0 excitation reconstruction modules 104 or 114 are activated. Conversely, when the type classification is Type One, the F1 or H1 excitation reconstruction modules 106 or 116 are activated. The F0 or F1 LPC reconstruction modules 108 or 110 are activated by the Type Zero and Type One type classifications, respectively. The H LPC reconstruction module 118 is activated based solely on the rate selection.

The quarter-rate decoder 94 includes an excitation reconstruction module 120 and an LPC reconstruction module 122. Similarly, the eighth-rate decoder 96 includes an excitation reconstruction module 124 and an LPC reconstruction module 126. Both the respective excitation reconstruction modules 120 or 124 and the respective LPC reconstruction modules 122 or 126 are activated based solely on the rate selection, but other activating inputs may be provided.

Each of the excitation reconstruction modules is operable to provide the short-term excitation on a short-term excitation line 128 when activated. Similarly, each of the LPC reconstruction modules operate to generate the short-term prediction coefficients on a short-term prediction coefficients line 131. The short-term excitation and the short-term prediction coefficients are provided to the synthesis filter 98. In addition, in one embodiment, the short-term prediction coefficients are provided to the post-processing module 100 as illustrated in FIG. 3.

The post-processing module 100 can include filtering, signal enhancement, noise modification, amplification, tilt correction and other similar techniques capable of increasing the perceptual quality of the synthesized speech. Decreasing audible noise may be accomplished by emphasizing the formant structure of the synthesized speech or by suppressing only the noise in the frequency regions that are perceptually not relevant for the synthesized speech. Since audible noise becomes more noticeable at lower bit rates, one embodiment of the post-processing module 100 may be activated to provide post-processing of the synthesized speech differently depending on the rate selection. Another embodiment of the post-processing module 100 may be operable to provide different post-processing to different groups of the decoders 90, 92, 94 and 96 based on the rate selection.

During operation, the initial frame-processing module 44 illustrated in FIG. 3 analyzes the speech signal 18 to determine the rate selection and activate one of the codecs 22, 24, 26 or 28. If for example, the full-rate codec 22 is activated to process a frame based on the rate selection, the initial full-rate frame-processing module 46 determines the type classification for the frame and generates a portion of the bitstream. The full-rate module 56, based on the type classification, generates the remainder of the bitstream for the frame.

The bitstream may be received and decoded by the full-rate decoder 90 based on the rate selection. The full-rate decoder 90 decodes the bitstream utilizing the type classification that was determined during encoding. The synthesis filter 98 and the post-processing module 100 use the parameters decoded from the bitstream to generate the post-processed synthesized speech 20. The bitstream that is generated by each of the codecs 22, 24, 26, or 28 contains significantly different bit allocations to emphasize different parameters and/or characteristics of the speech signal 18 within a frame.

Fixed Codebook Structure

The fixed codebook structure allows the smooth functioning of the coding and decoding of speech in one embodiment. As is well known in the art and described above, the codecs further comprise adaptive and fixed codebooks that help in minimizing the short term and long term residuals. It has been found that certain codebook structures are desirable when coding and decoding speech in accordance with the invention. These structures concern mainly the fixed codebook structure, and in particular, a fixed codebook which comprises a plurality of subcodebooks. In one embodiment, a plurality of fixed subcodebooks is searched for a best subcodebook and then for a codevector within the subcodebook selected. For searching purposes, a codebook may be defined as either a codebook or a subcodebook.

Figure 5:
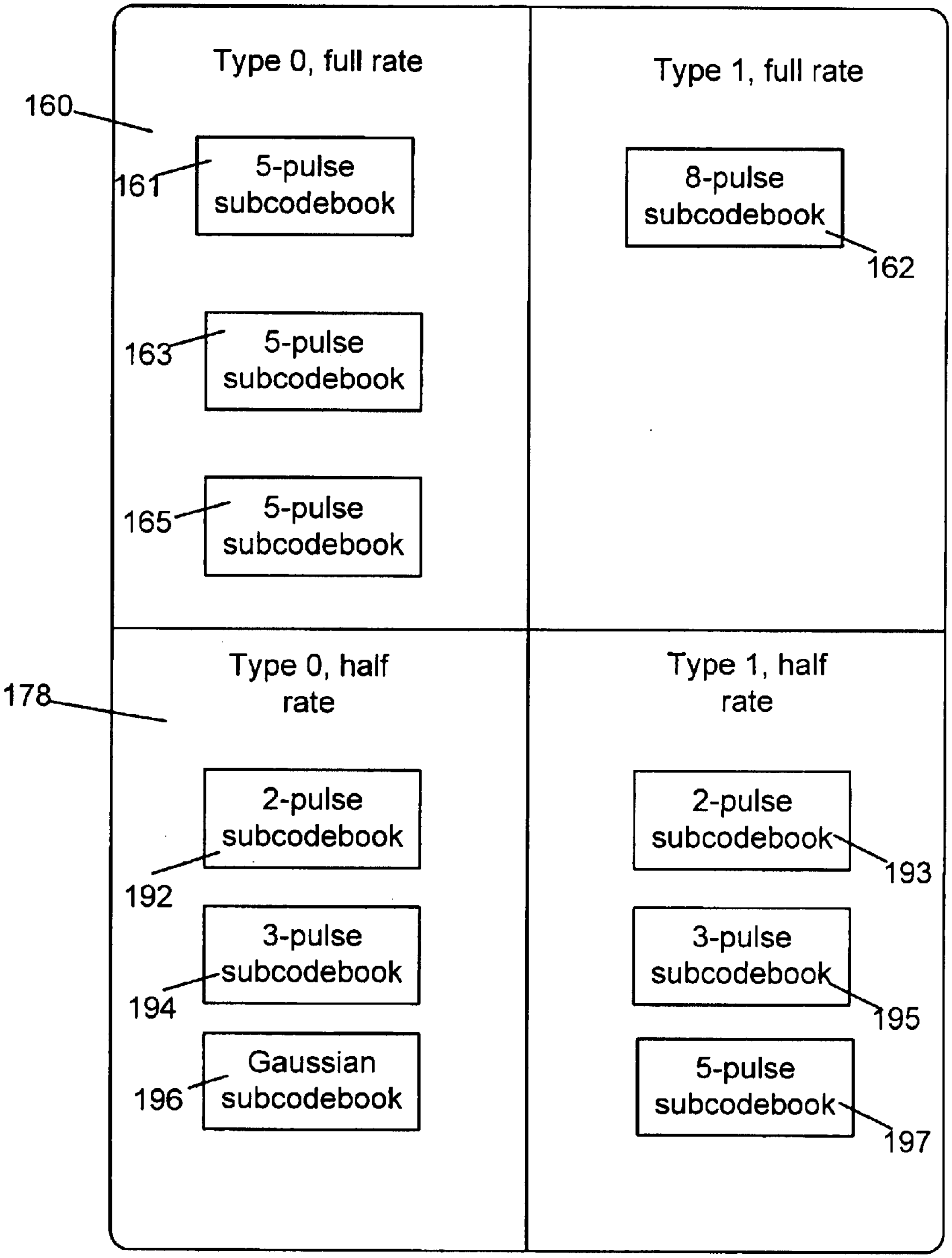
FIG. 5 is a block diagram illustrating fixed codebooks.

FIG. 5 is a block diagram depicting the structure of fixed codebooks and subcodebooks in one embodiment. The fixed codebook for the F0 codec comprises three (different) subcodebooks 161, 163 and 165, each of them having 5 pulses. The fixed codebook for the F1 codec is a single 8-pulse subcodebook 162. For the half-rate codec, the fixed codebook 178 comprises three subcodebooks for the H0, a 2-pulse subcodebook 192, a three-pulse subcodebook 194, and a third subcodebook 196 with Gaussian noise. In the H1 codec, the fixed codebook comprises a 2-pulse subcodebook 193, a 3-pulse subcodebook 195, and a 5-pulse subcodebook 197. In another embodiment, the H1 codec comprises only a 2-pulse subcodebook 193 and a 3-pulse subcodebook 195.

Weighting Factors in Selecting a Fixed Subcodebook and a Codevector

Low-bit rate coding uses the important concept of perceptual weighting to determine speech coding. We introduce here a special weighting factor different from the factor previously described for the perceptual weighting filter in the closed-loop analysis. This special weighting factor is generated by employing certain features of speech, and applied as a criterion value in favoring a specific subcodebook in a codebook featuring a plurality of subcodebooks. One subcodebook may be preferred over the other subcodebooks for some specific speech signal, such as noise-like unvoiced speech. The features used to calculate the weighting factor, include, but are not limited to, the noise-to-signal ratio (NSR), sharpness of the speech, the pitch lag, the pitch correlation, as well as other features. The classification system for each frame of speech is also important in defining the features of the speech.

The NSR is a traditional distortion criterion that may be calculated as the ratio between an estimate of the background noise energy and the frame energy of a frame. One embodiment of the NSR calculation ensures that only true background noise is included in the ratio by using a modified voice activity decision. In addition, previously calculated parameters representing, for example, the spectrum expressed by the reflection coefficients, the pitch correlation $R_p$, the NSR, the energy of the frame, the energy of the previous frames, the residual sharpness and the weighted speech sharpness may also be used. Sharpness is defined as the ratio of the average of the absolute values of the samples to the maximum of the absolute values of the samples of speech. In addition, prior to the fixed-codebook search, a refined subframe search classification decision is obtained from the frame class decision and other speech parameters.

Pitch Correlation

One embodiment of the target signal for time warping is a synthesis of the current segment derived from the modified weighted speech that is represented by $s'_w(n)$ and the pitch track 348 represented by $L_p(n)$. According to the pitch track 348, $L_p(n)$, each sample value of the target signal $s_w^t(n)$, $n=0, \ldots, N_s-1$ may be obtained by interpolation of the modified weighted speech using a $21^{st}$ order Hamming weighted Sinc window, $$s_w^t(n) = \sum_{i=-10}^{10} w_s(f(L_p(n)), i) \cdot s'_w(n - I(L_p(n)) + i), \quad \text{(Equation 1)}$$

$$for\ n = 0, \ldots, N_s - 1$$

where $I(L_p(n))$ and $f(L_p(n))$ are the integer and fractional parts of the pitch lag, respectively; $w_s(f,i)$ is the Hamming weighted Sinc window, and $N_s$ is the length of the segment. A weighted target, $s_w^{wt}(n)$, is given by $s_w^{wt}(n)=w_e(n)\cdot s_w^t(n)$. The weighting function, $w_e(n)$, may be a two-piece linear function, which emphasizes the pitch complex and de-emphasizes the "noise" in between pitch complexes. The weighting may be adapted according to a classification, by increasing the emphasis on the pitch complex for segments of higher periodicity.

Signal Warping

The modified weighted speech for the segment may be reconstructed according to the mapping given by $$[s_w(n+\tau_{acc}), s_w(n+\tau_{acc}+\tau_c+\tau_{opy})] \rightarrow [s'_w(n), s'_w(n+\tau_c-1)], \quad \text{(Equation 2)}$$

and $$[s_w(n+\tau_{acc}+\tau_c+\tau_{opt}), s_w(n+\tau_{acc}+\tau_{opt}+N_s-1)] \rightarrow [s'_w(n+\tau_c), s'_w(n+N_s-1)], \quad \text{(Equation 3)}$$

where $\tau_c$ is a parameter defining the warping function. In general, $\tau_c$ specifies the beginning of the pitch complex. The mapping given by Equation 2 specifies a time warping, and the mapping given by Equation 3 specifies a time shift (no warping). Both may be carried out using a Hamming weighted Sinc window function.

Pitch Gain and Pitch Correlation Estimation

The pitch gain and pitch correlation may be estimated on a pitch cycle basis and are defined by Equations 2 and 3, respectively. The pitch gain is estimated in order to minimize the mean squared error between the target $s_w^t(n)$, defined by Equation 1, and the final modified signal $s'_w(n)$, defined by Equations 2 and 3, and may be given by $$g_a = \frac{\sum_{n=0}^{N_s-1} s'_w(n) \cdot s_w^t(n)}{\sum_{n=0}^{N_s-1} s_w^t(n)^2}. \quad \text{(Equation 4)}$$

The pitch gain is provided to the excitation-processing module 54 as the unquantized pitch gains. The pitch correlation may be given by $$R_a = \frac{\sum_{n=0}^{N_s-1} s'_w(n) \cdot s_w^t(n)}{\sqrt{\left(\sum_{n=0}^{N_s-1} s'_w(n)^2\right) \cdot \left(\sum_{n=0}^{N_s-1} s_w^t(n)^2\right)}}. \quad \text{(Equation 5)}$$

Both parameters are available on a pitch cycle basis and may be linearly interpolated.

Fixed Codebook Encoding for Type 0 Frames

Figure 6:
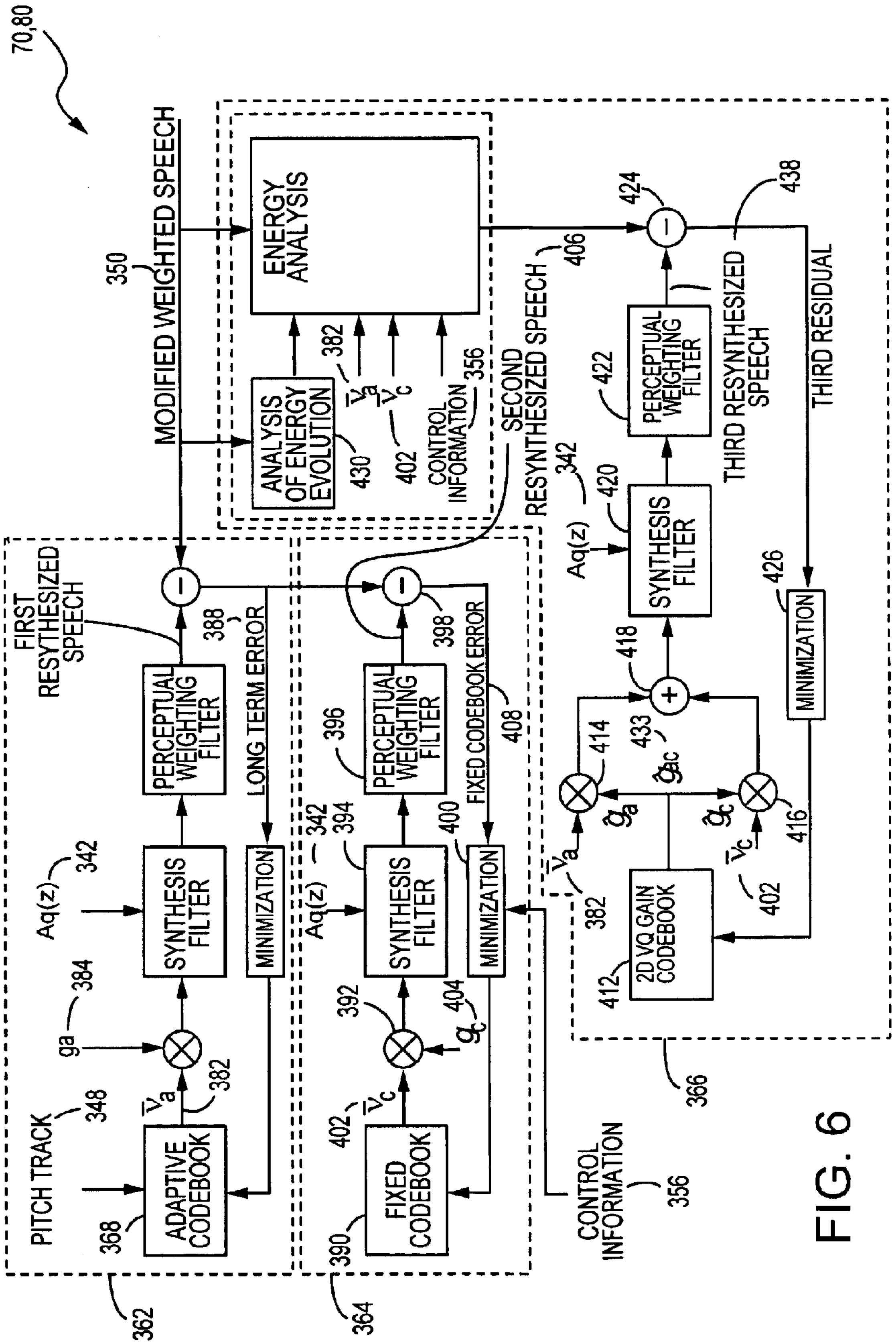
FIG. 6 is an extended block diagram of the speech coding system.

FIG. 6 comprises F0 and H0 subframe processing modules 70 and 80, including an adaptive codebook section 362, a fixed codebook section 364, and a gain quantization section 366. The adaptive codebook section 368 receives a pitch track 348 useful in calculating an area in the adaptive codebook to search for an adaptive codebook vector $v_a$ 382 (a lag). The adaptive codebook also performs a search to determine and store the best lag vector $v_a$ for each subframe. An adaptive gain, $g_a$ 384, is also calculated in this portion of the speech system. The discussion here will focus on the fixed codebook section, and particularly on the fixed subcodebooks contained therein. FIG. 6 depicts the fixed codebook section 364, including a fixed codebook 390, a multiplier 392, a synthesis filter 394, a perceptual weighting filter 396, a subtractor 398, and a minimization module 400. The search for the fixed codebook contribution by the fixed codebook section 364 is similar to the search within the adaptive codebook section 362. Gain quantization section 366 may include a 2D VQ gain codebook 412, a first multiplier 414 and a second multiplier 416, adder 418, synthesis filter 420, perceptual weighting filter 422, subtractor 424 and a minimization module 426. Gain quantization section makes use of the second resynthesized speech 406 generated in the fixed codebook section, and also generates a third resynthesized speech 438.

A fixed codebook vector ($v_c$) 402 representing the long-term residual for a subframe is provide from the fixed codebook 390. The multiplier 392 multiplies the fixed codebook vector ($v_c$) 402 by a gain ($g_c$) 404. The gain ($g_c$) 404 is unquantized and is a representation of the initial value of the fixed codebook gain that may be calculated as later described. The resulting signal is provided to the synthesis filter 394. The synthesis filter 394 receives the quantized LPC coefficients $A_q(z)$ 342 and together with the perceptual weighting filter 396, creates a resynthesized speech signal 406. The subtractor 398 subtracts the resynthesized speech signal 406 from a long-term error signal 388 to generate a fixed codebook error signal 408.

The minimization module 400 receives the fixed codebook error signal 408 that represents the error in quantizing the long-term residual by the fixed codebook 390. The minimization module 400 uses the fixed codebook error signal 408 and in particular the energy of the fixed codebook error signal 408, which is called the weighted mean square error (WMSE), to control the selection of vectors for the fixed codebook vector ($v_c$) 402 from the fixed codebook 292 in order to reduce the error. The minimization module 400 also receives the control information 356 that may include a final characterization for each frame.

The final characterization class contained in the control information 356 controls how the minimization module 400 selects vectors for the fixed codebook vector ($v_c$) 402 from the fixed codebook 390. The process repeats until the search by the second minimization module 400 has selected the best vector for the fixed codebook vector ($v_c$) 402 from the fixed codebook 390 for each subframe. The best vector for the fixed codebook vector ($v_c$) 402 minimizes the error in the second resynthesized speech signal 406 with respect to the long-term error signal 388. The indices identify the best vector for the fixed codebook vector ($v_c$) 402 and, as previously discussed, may be used to form the fixed codebook components 146*a* and 178*a*.

Type 0 Fixed Codebook Search for the Full-rate Codec

The fixed codebook component 146*a* for frames of Type 0 classification may represent each of four subframes of the full-rate codec 22 using the three different 5-pulse subcodebooks 160. When the search is initiated, vectors for the fixed codebook vector ($v_c$) 402 within the fixed codebook 390 may be determined using the error signal 388 represented by:

$$t'(n) = t(n) - g_a \cdot (e(n - L_p^{opt}) * h(n)). \quad \text{(Equation 6)}$$

where t' (n) is a target for a fixed codebook search, t(n) is an original target signal, $g_a$ is an adaptive codebook gain, e(n) is a past excitation to generate an adaptive codebook contribution, $L_p^{opt}$ is an optimized lag, and h(n) is an impulse response of a perceptually weighted LPC synthesis filter.

Pitch enhancement may be applied to the 5-pulse subcodebooks 161, 163, 165 within the fixed codebook 390 in the forward direction or the backward direction during the search. The search is an iterative, controlled complexity search for the best vector from the fixed codebook. An initial value for fixed codebook gain represented by the gain ($g_c$) 404 may be found simultaneously with the search.

Figure 7:
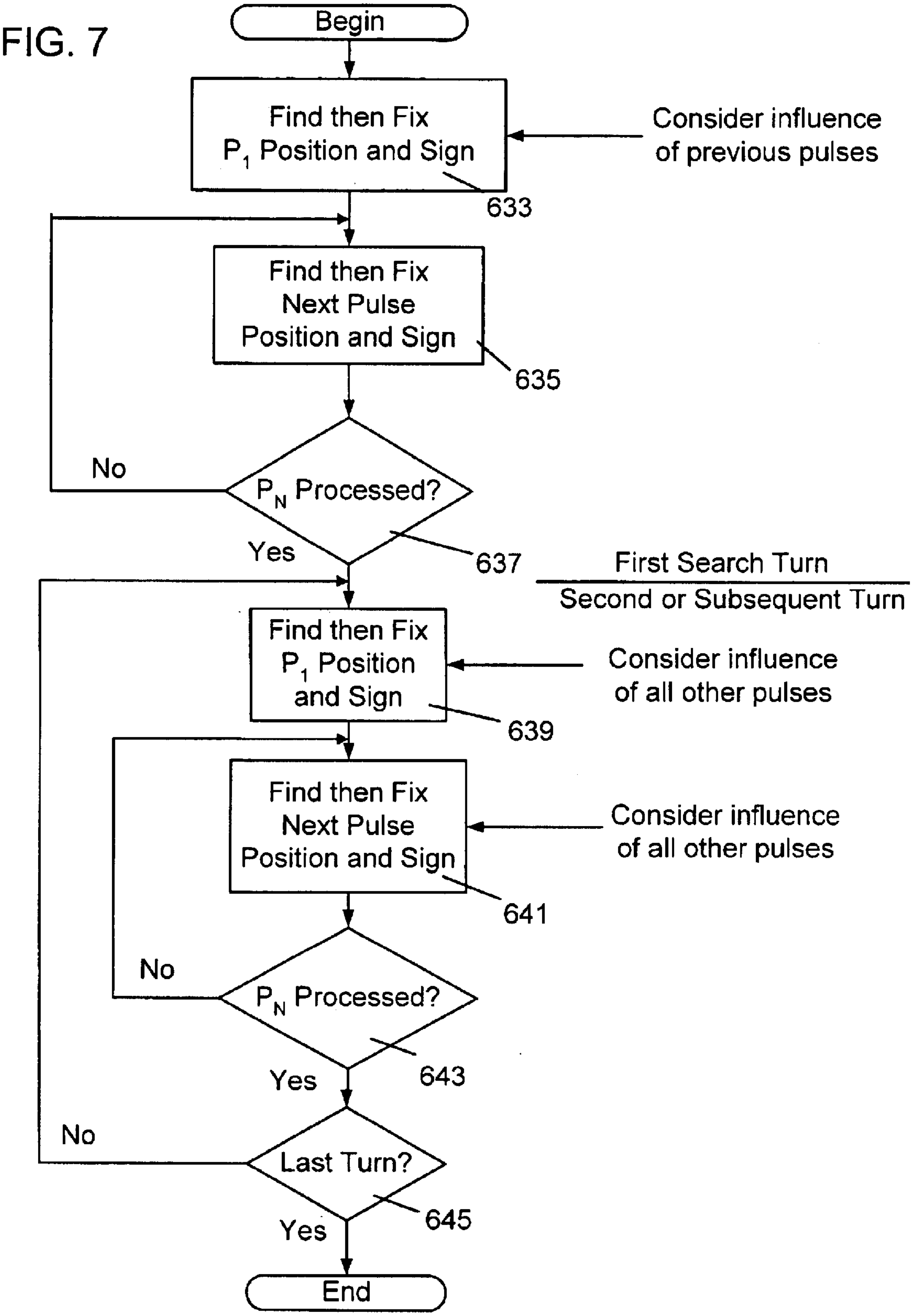
FIG. 7 is a flow chart for a process for finding a fixed subcodebook.
Figure 8:
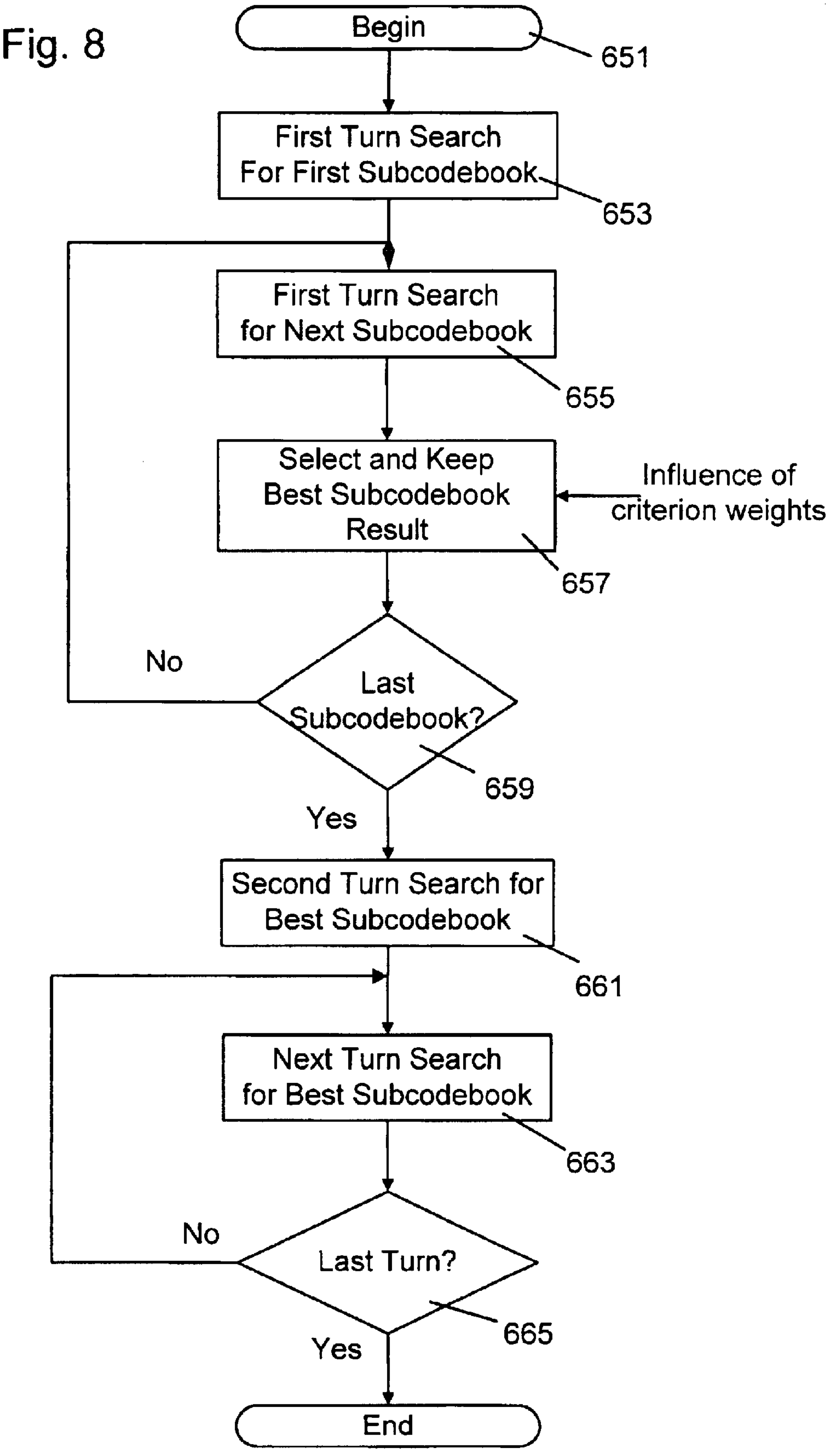
FIG. 8 is a flow chart for a process for finding a fixed subcodebook.

FIGS. 7 and 8 illustrate the procedure used to search for the best indices in the fixed codebook. In one embodiment, a fixed codebook has k subcodebooks. More or fewer subcodebooks may be used in other embodiments. In order to simplify the description of the iterative search procedure, the following example first features a single subcodebook containing N pulses. The possible location of a pulse is defined by a plurality of positions on a track. In a first searching turn, the encoder processing circuitry searches the pulse positions sequentially from the first pulse 633 ($P_N$=1) to the next pulse 635, until the last pulse 637 ($P_N$=N). Each pulse is determined by selecting the location, sign and magnitude of the pulse. In an N-pulse codebook or subcodebook, each pulse, from the first pulse to the next pulse to the last pulse, is selected by selecting the location, sign and magnitude of the pulse.

For each pulse after the first, the searching of the current pulse position is conducted by considering the influence from previously-located pulses. The influence is the desirable minimizing of the energy of the fixed subcodebook error signal 408 or the criterion. The position of each pulse may be considered temporary, or temporally determined, until the search ends. Typically, as a search proceeds through codebooks, subcodebooks, pulses and turns, the signal error becomes less and less, or the criterion grows. As the location of each pulse is selected or tried, the criterion is evaluated anew, considering the influence of all other pulses, temporally determined from the previous turn or the current turn, and where all pulses have a next signal error in relation to the speech waveform, in which the signal error is typically less than the previous signal error. In the situation in which an N-pulse subcodebook is used, and k turns are used, the last pulse is likewise determined by considering the influence of all the other temporally determined pulses from the previous turn and the last turn, and in which the pulses have a last signal error, and the result of the search is a codevector candidate having N pulses. In one method of conducting the search, a second or subsequent searching turn is conducted until a desired last turn is completed.

In a second searching turn, the encoder processing circuitry corrects each pulse position sequentially, again from the first pulse 639 to the last pulse 641, by considering the influence of all the other pulses. In subsequent turns, the functionality of the second or subsequent searching turn is repeated, until the last turn is reached 643. Further turns may be utilized if the added complexity is allowed. This procedure is followed until k turns are completed 645 and a value is calculated for the subcodebook.

FIG. 8 is a flow chart for the method described in FIG. 7 to be used for searching a fixed codebook comprising a plurality of subcodebooks. A first turn is begun 651 by searching a first subcodebook 653, and searching the other subcodebooks 655, in the same manner described for FIG. 7, and keeping the best result 657, until the last subcodebook is searched 659. If desired, a second turn 661 or subsequent turn 663 may also be used, in an iterative fashion. In some embodiments, to minimize complexity and shorten the search, one of the subcodebooks in the fixed codebook is typically chosen after finishing the first searching turn. Further searching turns are done only with the chosen subcodebook. In other embodiments, one of the subcodebooks might be chosen only after the second searching turn or thereafter, should processing resources so permit. Computations of minimum complexity are desirable, especially since two or three times as many pulses are calculated, rather than one pulse before enhancements described herein are added. Typically, as the search progresses from a first searching turn to a second and then a subsequent searching turn, the signal error becomes less, or the criterion calculated grows. Thus, the error tends to become less and less as the search progresses. At the last searching turn, where the last signal error is less than the previous signal error, the search provides the proper number of pulses, in this case N, for the codevector candidate.

In an example embodiment, the search for the best vector for the fixed codebook vector ($v_c$) 402 is completed in each of the three 5-pulse codebooks 160. At the conclusion of the search process within each of the three 5-pulse codebooks 160, candidate best vectors for the fixed codebook vector ($v_c$) 402 have been identified. Selection of which of the candidate best vectors from which of the 5-pulse codebooks 160 will be used may be determined minimizing the corresponding fixed codebook error signal 408 for each of the three best vectors. For purposes of this discussion, the corresponding fixed codebook error signal 408 for each of the three candidate subcodebooks will be referred to as first, second, and third fixed subcodebook error signals.

The minimization of the weighted mean square errors (WMSE) from the first, second and third fixed codebook error signals is mathematically equivalent to maximizing a criterion value which may be first modified by multiplying a weighting factor in order to favor selecting one specific subcodebook. Within the full-rate codec 22 for frames classified as Type Zero, the criterion value from the first, second and third fixed codebook error signals may be weighted by the subframe-based weighting measures. The weighting factor may be estimated by using a sharpness measure of the residual signal, a voice-activity detection module, a noise-to-signal ratio (NSR), and a normalized pitch correlation. Other embodiments may use other weighting factor measures. Based on the weighting and on the maximal criterion value, one of the three 5-pulse fixed codebooks 160, and the best candidate vector in that subcodebook, may be selected.

The selected 5-pulse codebook 161, 163 or 165 may then be fine searched for a final decision of the best vector for the fixed codebook vector ($v_c$) 402. The fine search is performed on the vectors in the selected 5-pulse codebook 160 with the best candidate vector chosen as initial starting vector. The indices that identify the best vector (maximal criterion value) from the fixed codebook vector are in the bitstream to be transmitted to the decoder.

In one embodiment, the fixed-codebook excitation for the 4-subframe full-rate coder is represented by 22 bits per subframe. These bits may represent several possible pulse distributions, signs and locations. The fixed-codebook excitation for the half-rate, 2-subframe coder is represented by 15 bits per subframe, also with pulse distributions, signs, and locations, as well as possible random excitation. Thus, 88 bits are used for fixed excitation in the full-rate coder, and 30 bits are used for the fixed excitation in the half-rate coder. In one embodiment, a number of different subcodebooks as depicted in FIG. 5 comprises the fixed codebook. A search routine is used, and only the best matched vector from one subcodebook is selected for further processing.

The fixed codebook excitation is represented with 22 bits for each of the four subframes of the full-rate codec for frames of type 0 (F0). As shown in FIG. 5, the fixed codebook for type 0, full rate codebook 160 has three subcodebooks. A first codebook 161 has 5 pulses and $2^{21}$ entries. The second codebooks 163 also has 5 pulses and $2^{20}$ entries, while the third fixed subcodebook 165 uses 5 pulses and has $2^{20}$ entries. The distribution of the pulse locations is different in each of the subcodebooks. One bit is used to distinguish between the first codebook or either the second or the third codebook, and another bit is used to distinguish between the second and the third codebook.

The first subcodebook of the F0 codec has a 21 bit structure (along with the $22^{nd}$ bit to distinguish which subcodebook), in which this 5-pulse codebook uses 4 bits (16 positions) per track for each of three tracks, and 3 bits for each of 2 tracks, so that 21 bits represent the pulse locations (three bits for signs, and 3 tracks×4 bits+2 tracks×3 bits=18 bits). An example of a 5-pulse, 21 bit fixed subcodebook coding method, for each subframe is as follows:

Pulse 1: {1, 3, 6, 8, 11, 13, 16, 18, 21, 23, 26, 28, 31, 33, 36, 38}
Pulse 2: {4, 9, 14, 19, 24, 29, 34, 39}
Pulse 3: {1, 3, 6, 8, 11, 13, 16, 18, 21, 23, 26, 28, 31, 33, 36, 38}
Pulse 4: {4, 9, 14, 19, 24, 29, 34, 39}
Pulse 5: {0, 2, 5, 7, 10, 12, 15, 17, 20, 22, 25, 27, 30, 32, 35, 37}, where the numbers represent the location inside the subframe.

Figure 10:
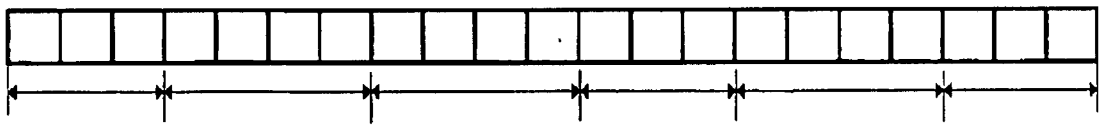
FIG. 10 is a schematic diagram of a subcodebook structure.

Note that two of the tracks are "3-bit" with 8 non-zero positions, while the other three are "4-bit" with 16 positions. Note that the track for the $2^{nd}$ pulse is the same as the track for the $4^{th}$ pulse, and that the track for the $3^{rd}$ pulse is the same as the track for the $1^{st}$ pulse. However, the location of the $2^{nd}$ pulse is not necessarily the same as the location of the $4^{th}$ pulse and the location of the $3^{rd}$ pulse is not necessarily the same as the location of the $1^{st}$ pulse. For example, the $2^{nd}$ pulse can be at the location 14, while the $4^{th}$ pulse can be at the location 29. Since there are 16 possible locations for Pulse 1, Pulse 3, and Pulse 5, each is represented with 4 bits. Since there are 8 possible locations for Pulse 2 and Pulse 4, each is represented with 3 bits. One bit is used to represent the sign of Pulse 1; 1 bit is used to represent the combined sign of Pulse 2 and Pulse 4; and 1 bit is used to represent the combined sign of Pulse 3 and Pulse 5. The combined sign uses the redundancy of the information in the pulse locations. For example, placing Pulse 2 at location 11 and Pulse 4 at location 36 is the same as placing Pulse 2 at location 36 and placing Pulse 4 at location 11. This redundancy is equivalent to 1 bit, and therefore two distinct signs are transmitted with a single bit for Pulse 2 and Pulse 4, as well as for Pulse 3 and Pulse 5. The overall bit stream for this codebook comprises 1+1+1+4+3+4+3+4=21 bits. This fixed subcodebook structure is depicted in FIG. 10.

One structure for second five-pulse subcodebook 163, this one with $2^{20}$ entries, may be represented as a matrix in five tracks. 20 bits is sufficient to represent the 5-pulse subcodebook, with three bits (8 positions per track) required for each position, 5×3=15 bits, and 5 bits for the signs. (As noted above, the other 2 bits indicate which of the three subcodebooks are used, for a total of 22 bits per subframe.)

Figure 11:
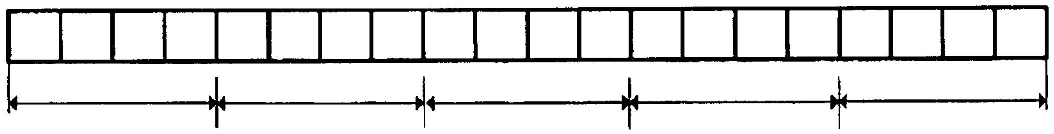
FIG. 11 is a schematic diagram of a subcodebook structure.

Pulse 1: {0, 1, 2, 3, 4, 6, 8, 10}
Pulse 2: {5, 9, 13, 16, 19, 22, 25, 27}
Pulse 3: {7, 11, 15, 18, 21, 24, 28, 321
Pulse 4: {12, 14, 17, 20, 23, 26, 30, 34}
Pulse 5: {29, 31, 33, 35, 36, 37, 38, 39}, where the numbers represent the location inside the subframe. Since each track has 8 possible locations, the location for each pulse is transmitted using 3 bits for each pulse. One bit is used to indicate the sign of each pulse. Therefore, the overall bit stream for this codebook comprises of 1+3+1+3+1+3+1+3+1+3=20 bits. This structure is illustrated in FIG. 11.

The structure for the third five-pulse subcodebook 165 of the fixed codebook in the same 20-bit environment is

Figure 12:
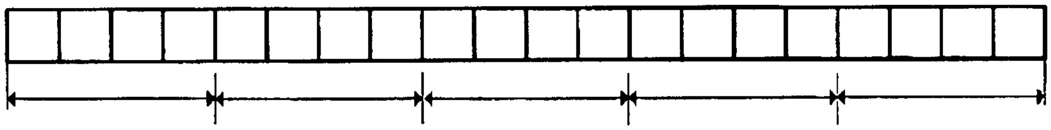
FIG. 12 is a schematic diagram of a subcodebook structure.

| |
|---|
| Pulse 1: {0, 1, 2, 3, 4, 5, 6, 7} |
| Pulse 2: {8, 9, 10, 11, 12, 13, 14, 15} |
| Pulse 3: {16, 17, 18, 19, 20, 21, 22, 23} |
| Pulse 4: {24, 25, 26, 27, 28, 29, 30, 31} |
| Pulse 5: {32, 33, 34, 35, 36, 37, 38, 39}, |

where the numbers represent the location inside the subframe. Since each track has 8 possible locations, the location for each pulse can be transmitted using 3 bits for each pulse. One bit is used for to indicate the sign of each pulse. Therefore, the overall bit stream for this codebook comprises 1+3+1+3+1+3+1+3+1+3=20 bits. This structure is illustrated in FIG. 12.

In the F0 codec, each search turn results in a candidate vector from each subcodebook, and a corresponding criterion value, which is a function of the weighted mean squared error, resulting from using that selected candidate vector. Note that the criterion value is such that maximization of the criterion value results in minimization of the weighted mean squared error (WMSE). The first subcodebook is searched first, using a first turn (sequentially adding the pulses) and a second turn (another refinement of the pulse locations). The second subcodebook is then searched using only a first turn. If the criterion value from that second subcodebook is larger than the criterion value from the first sub-codebook, the second sub-codebook is temporarily selected, and if not, the first sub-codebook is temporarily selected. The criterion value of the temporarily selected sub-codebook is then modified, using a pitch correlation, the refined subframe class decision, the residual sharpness, and the NSR. Then the third subcodebook is searched using a first turn followed by a second turn. If the criterion value from the search of the third sub-codebook is larger than the modified criterion value of the temporarily selected subcodebook, the third subcodebook is selected as the final sub-codebook, if not, the temporarily selected subcodebook (first or second) is the final subcodebook. The modification of the criterion value helps to select the third subcodebook (which is more suitable for the representation of noise) even if the criterion value of the third sub-codebook is slightly smaller than the criterion value of the first or the second sub-codebook.

The final subcodebook is further searched using a third turn if the first or the third subcodebook was selected as the final subcodebook, or a second turn if the second subcodebook was selected as the final subcodebook, to select the best pulse locations in the final sub-codebook.

Type 0 Fixed Codebook for the Half-rate Codec

The fixed codebook excitation for the half rate codec of Type 0 uses 15 bits for each of the two subframes of the half-rate codec for frames. The codebook has three subcodebooks, where two are pulse codebooks and the third is a Gaussian codebook. The type 0 frames use 3 codebooks for each of the two subframes. The first codebook 192 has 2 pulses, the second codebook 194 has 3 pulses, and the third code book 196 comprises random excitation, predetermined using the Gaussian distribution (Gaussian codebook). The initial target for the fixed codebook gain represented by the gain ($g_c$) 404 may be determined similarly to the full-rate codec 22. In addition, the search for the fixed codebook vector ($v_c$) 402 within the fixed codebook 390 may be weighted similarly to the full-rate codec 22. In the half-rate codec 24, the weighting may be applied to the best vector from each of the pulse codebooks 192, 194 as well as the Gaussian codebook 196. The weighting is applied to determine the most suitable fixed codebook vector ($v_c$) 402 from a perceptual point of view.

In addition, the weighting of the weighted mean squared error in the half-rate codec 24 may be further enhanced to emphasize the perceptual point of view. Further enhancement may be accomplished by including additional parameters in the weighting. The additional factors may be the closed loop pitch lag and the normalized adaptive codebook correlation. Other characteristics may provide further enhancement to the perceptual quality of the speech.

The selected codebook, the pulse locations and the pulse signs for the pulse codebook or the Gaussian excitation for the Gaussian codebook are encoded in 15 bits for each subframe of 80 samples. The first bit in the bit stream indicates which codebook is used. If the first bit is set to '1' the first codebook is used, and if the first bit is set to '0', either the second codebook or the third codebook is used. If the first bit is set to '1', all the remaining 14 bits are used to describe the pulse locations and signs for the first codebook. If the first bit is set to '0', the second bit indicates whether the second codebook is used or the third codebook is used. If the second bit is set to '1', the second codebook is used, and if the second bit is set to '0', the third codebook is used. The remaining 13 bits are used to describe the pulse locations and signs for the second codebook or the Gaussian excitation for the third codebook.

The tracks for the 2-pulse subcodebook have 80 positions, and are given by

| |
|---|
| Pulse 1: |
| 0, 1, 2, 3, 4, 5, 6, 7, 8, 9, 10, 11, 12, 13, 14, 15, |
| 16, 17, 18, 19, 20, 21, 22, 23, 24, 25, 26, 27, 28, 29, 30, 31, |
| 32, 33, 34, 35, 36, 37, 38, 39, 40, 41, 42, 43, 44, 45, 46, 47, |
| 48, 49, 50, 51, 52, 53, 54, 55, 56, 57, 58, 59, 60, 61, 62, 63, |
| 64, 65, 66, 67, 68, 69, 70, 71, 72, 73, 74, 75, 76, 77, 78, 79 |
| Pulse 2: |
| 0, 1, 2, 3, 4, 5, 6, 7, 8, 9, 10, 11, 12, 13, 14, 15, |
| 16, 17, 18, 19, 20, 21, 22, 23, 24, 25, 26, 27, 28, 29, 30, 31, |
| 32, 33, 34, 35, 36, 37, 38, 39, 40, 41, 42, 43, 44, 45, 46, 47, |
| 48, 49, 50, 51, 52, 53, 54, 55, 56, 57, 58, 59, 60, 61, 62, 63, |
| 64, 65, 66, 67, 68, 69, 70, 71, 72, 73, 74, 75, 76, 77, 78, 79 |

Figure 13:
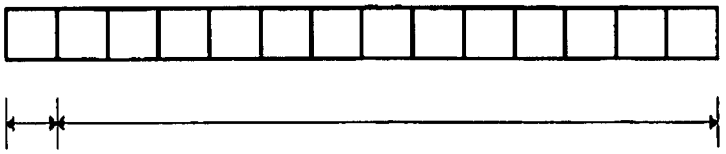
FIG. 13 is a schematic diagram of a subcodebook structure.

Since $\log_2(80)=6.322\ldots$, less than 6.5, the location for both pulses can be combined and coded using 2×6.5=13 bits. The first index is multiplied by 80, and the second index is added to the result. This results in a combined index number that is smaller than $2^{13}=8192$, and can be represented by 13 bits. At the decoder, the first index is obtained by integer division of the combined index number by 80, and the second index is obtained by the reminder of the division of the combined index number by 80. Since the tracks for the two pulses overlap, only 1 bit represents both signs. Therefore, the overall bit stream for this codebook comprise 1+13=14 bits. This structure is depicted in FIG. 13.

For the 3-pulse subcodebook, the location of each pulse is restricted to special tracks, which are generated by the combination of a general location (defined by the starting point) of the group of three pulses, and the individual relative displacement of each of the three pulses from the general location. The general location (called "phase") is defined by 4 bits, and the relative displacement for each pulse is defined by 2 bits per pulse. Three additional bits define the signs for the three pulses. The phase (the starting point of placing the 3 pulses) and the relative location of the pulses are given by:

| |
|---|
| Phase 1: {0, 4, 8, 12, 16, 20, 24, 28, 33, 38, 43, 48, 53, 58, 63, 68}. |
| Pulse 1: 0, 3, 6, 9 |
| Pulse 2: 1, 4, 7, 10 |
| Pulse 3: 2, 5, 8, 11 |

Figure 14:
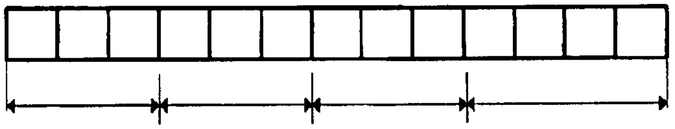
FIG. 14 is a schematic diagram of a subcodebook structure.

The following example illustrates how the phase is combined with the relative location. For the phase index 7, the phase is 28 (the $8^{th}$ location, since indices start from 0). Then the first pulse can be only at the locations 28, 31, 34, or 37, the second pulse can be only at the locations 29, 32, 35, or 38, and the third pulse can be only at the locations 30, 33, 36, or 39. The overall bit stream for the codebook comprises 1+2+1+2+1+2+4=13 bits, in the sequence of Pulse 1 relative sign and location, Pulse 2 relative sign and location, Pulse 3 relative sign and location, phase location. This 3-pulse fixed subcodebook structure is depicted in FIG. 14.

In another embodiment, for the second subcodebook with 3 pulses, the location of each pulse for frames of Type 0 is limited to special tracks. The position of the first pulse is coded with a fixed track and the positions of the remaining two pulses are coded with dynamic tracks which are relative to the selected position of the first pulse. The fixed track for the first pulse and the relative tracks for the other two tracks are defined as follows:

| |
|---|
| Pulse 1: 0, 5, 10, 15, 20, 25, 30, 35, 40, 45, 50, 55, 60, 65, 70, 75. |
| Pulse 2: $Pos_1-7$, $Pos_1-5$, $Pos_1-3$, $Pos_1-1$, $Pos_1+1$, $Pos_1+3$, $Pos_1+5$, $Pos_1+7$. |
| Pulse 3: $Pos_1-6$, $Pos_1-4$, $Pos_1-2$, $Pos_1$, $Pos_1+2$, $Pos_1+4$, $Pos_1+6$, $Pos_1+8$. |

Of course, the dynamic track must be limited on the subframe range. The total number of bits for this second subcodebook is 13 bits=4 (pulse 1)+3 pulse 2)+3 (pulse 3)+3 (signs).

The Gaussian codebook is searched last using a fast search routine based on two orthogonal basis vectors. A weighted mean square error (WMSE) from the three codebooks is perceptually weighted for the final selection of codebook and the codebook indices. For the half-rate codec, type 0, there are two subframes, and 15 bits are used to characterize each subframe. The Gaussian codebook uses a table of predetermined random numbers, generated from the Gaussian distribution. The table contains 32 vectors of 40 random numbers in each vector. The subframe is filled with 80 samples by using two vectors, the first vector filling the even number locations, and the second vector filling the odd number locations. Each vector is multiplied by a sign that is represented by 1 bit.

45 random vectors are generated from the 32 vectors that are stored. The first 32 random vectors are identical to the 32 stored vectors. The last 13 random vectors are generated from the 13 first stored vectors in the table, where each vector is cyclically shifted to the left. The left-cyclic shift is accomplished by moving the second random number in each vector to the first position in the vector, the third random number is shifted to the second position, and so on. To complete the left-cyclic shift, the first random number is placed at the end of the vector. Since $\log_2(45)=5.492\ldots$ is less than 5.5, the indices of both random vectors may be combined and coded using 2×5.5=11 bits. The first index is multiplied by 45, and added to the second index. This result is a combined index number that is smaller than $2^{11}=2048$, and can be represented by 11 bits. The Gaussian codebook may thus generate and use many more vectors than are contained within the codebook itself.

Figure 15:
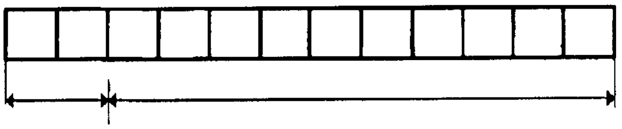
FIG. 15 is a schematic diagram of a subcodebook structure.

At the decoder, the first index is obtained by integer division of the combined index number by 45, and the second index is obtained by the reminder of the division of the combined index number by 45. The signs of the two vectors are also encoded, in order. Therefore, the overall bit stream for this codebook comprises of 1+1+11=13 bits. The Gaussian fixed subcodebook structure is shown in FIG. 15.

For the H0 codec, the first subcodebook is searched first, using a first turn (sequentially adding the pulses) and a second turn (another refinement of the pulse locations). The criterion value of the first subcodebook is then modified using a pitch lag and a pitch correlation. The second subcodebook is then searched in two steps. At the first step, a location that represents a possible center is found. Then the three pulse locations around that center are searched and determined. If the criterion value from that second subcodebook is larger than the modified criterion value from the first sub-codebook, the second sub-codebook is temporarily selected, and if not, the first sub-codebook is temporarily selected. The criterion value of the temporarily selected sub-codebook is further modified, using the refined subframe class decision, the pitch correlation, the residual sharpness, the pitch lag and the NSR. Then the Gaussian sub-codebook is searched. If the criterion value from the search of the Gaussian sub-codebook is larger than the modified criterion value of the temporarily selected subcodebook, the Gaussian subcodebook is selected as the final sub-codebook. If not, the temporarily selected subcodebook (first or second) is the final sub-codebook. The modification of the criterion value helps to select the Gaussian subcodebook (which is more suitable for the representation of noise) even if the criterion value of the Gaussian subcodebook is slightly smaller than the modified criterion value of the first subcodebook or the criterion value of the second subcodebook. The selected vector in the final sub-codebook is used without further refined search.

In another embodiment, a subcodebook is used that is neither Gaussian nor pulse type. This subcodebook may be constructed by a population method other than a Gaussian method, where at least 20% of the locations within the subcodebook are non-zero locations. Any method of construction may be used besides the Gaussian method.

Fixed Codebook Encoding for Type 1 Frames

Figure 9:
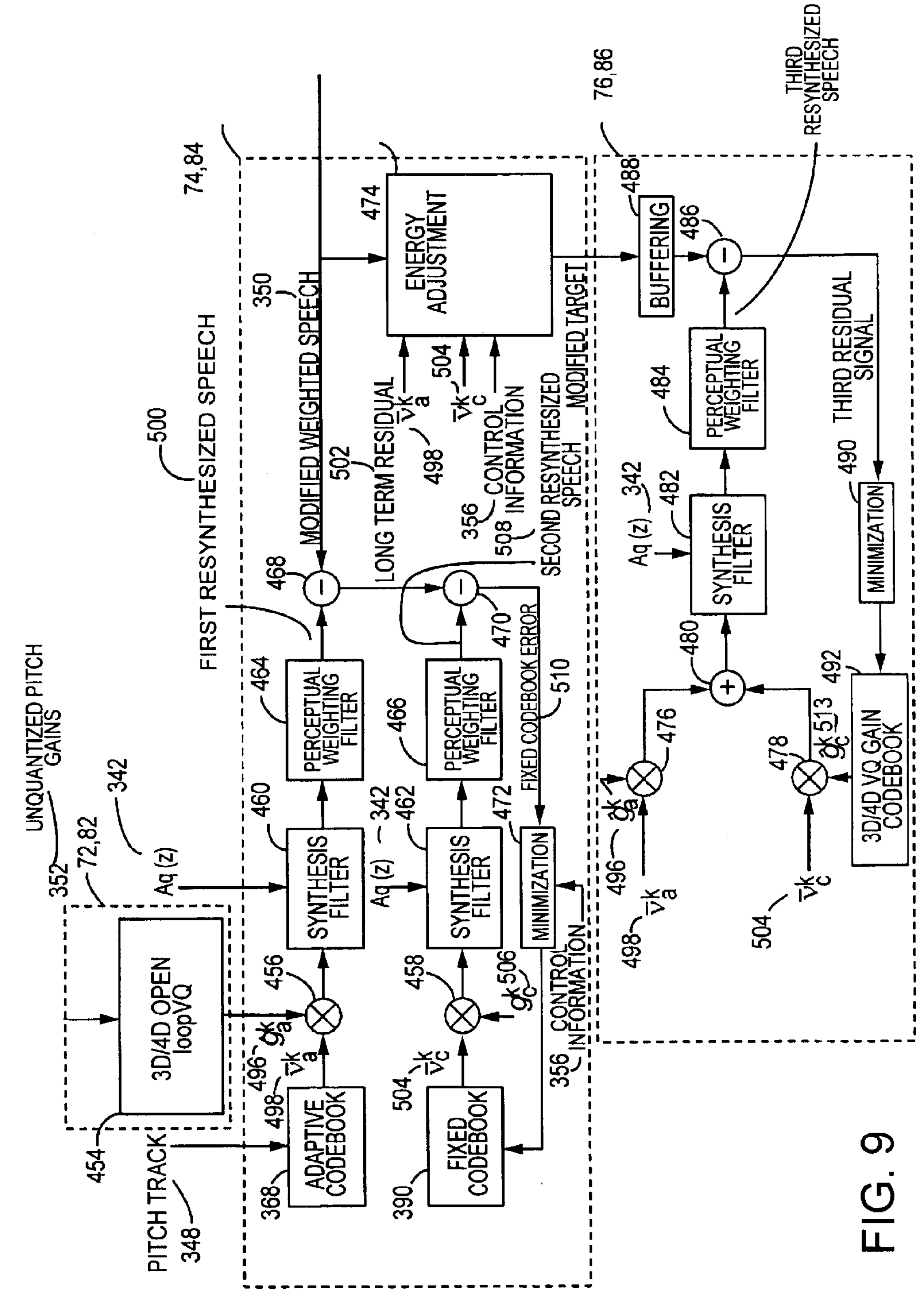
FIG. 9 is an extended block diagram of the speech coding system.

Referring now to FIG. 9, the F1 and H1 first frame processing modules 72 and 82 include a 3D/4D open loop VQ module 454. The F1 and H1 sub-frame processing modules 74 and 84 include the adaptive codebook 368, the fixed codebook 390, a first multiplier 456, a second multiplier 458, a first synthesis filter 460 and a second synthesis filter 462. In addition, the F1 and H1 sub-frame processing modules 74 and 84 include a first perceptual weighting filter 464, a second perceptual weighting filter 466, a first subtractor 468, a second subtractor 470, a first minimization module 472 and an energy adjustment module 474. The F1 and H1 second frame processing modules 76 and 86 include a third multiplier 476, a fourth multiplier 478, an adder 480, a third synthesis filter 482, a third perceptual weighting filter 484, a third subtractor 486, a buffering module 488, a second minimization module 490 and a 3D/4D VQ gain codebook 492.

The processing of frames classified as Type One within the excitation-processing module 54 provides processing on both a frame basis and a sub-frame basis. For purposes of brevity, the following discussion will refer to the modules within the full rate codec 22. The modules in the half rate codec 24 may be considered to function similarly unless otherwise noted. Quantization of the adaptive codebook gain by the F1 first frame-processing module 72 generates the adaptive gain component 148*b*. The F1 subframe processing module 74 and the F1 second frame processing module 76 operate to determine the fixed codebook vector and the corresponding fixed codebook gain, respectively as previously set forth. The F1 subframe-processing module 74 uses the track tables, as previously discussed, to generate the fixed codebook component 146*b* as illustrated in FIG. 6.

The F1 second frame processing module 76 quantizes the fixed codebook gain to generate the fixed gain component 150*b*. In one embodiment, the full-rate codec 22 uses 10 bits for the quantization of 4 fixed codebook gains, and the half-rate codec 24 uses 8 bits for the quantization of the 3 fixed codebook gains. The quantization may be performed using a moving average prediction. In general, before the prediction and the quantization are performed, the prediction states are converted to a suitable dimension.

In the full-rate codec, the Type One fixed codebook gain component 150*b* is generated by representing the fixed-codebook gains with a plurality of fixed codebook energies in units of decibels (dB). The fixed codebook energies are quantized to generate a plurality of quantized fixed codebook energies, which are then translated to create a plurality of quantized fixed-codebook gains. In addition, the fixed codebook energies are predicted from the quantized fixed codebook energy errors of the previous frame to generate a plurality of predicted fixed codebook energies. The difference between the predicted fixed codebook energies and the fixed codebook energies is a plurality of prediction fixed codebook energy errors. Different prediction coefficients are used for each subframe. The predicted fixed codebook energies of the first, the second, the third, and the fourth subframe are predicted from the 4 quantized fixed codebook energy errors of the previous frame using, respectively, the set of coefficients {0.7, 0.6, 0.4, 0.2}, {0.4, 0.2, 0.1, 0.05}, {0.3, 0.2, 0.075, 0.025}, and {0.2, 0.075, 0.025, 0.0}.

First Frame Processing Module

The 3D/4D open loop VQ module 454 receives the unquantized pitch gains 352 from a pitch pre-processing module (not shown). The unquantized pitch gains 352 represent the adaptive codebook gain for the open loop pitch lag. The 3D/4D open loop VQ module 454 quantizes the unquantized pitch gains 352 to generate a quantized pitch gain ($g^k_a$) 496 representing the best quantized pitch gains for each subframe where k is the number of subframes. In one embodiment, there are four subframes for the full-rate codec 22 and three subframes for the half-rate codec 24 which correspond to four quantized gains ($g^1_a$, $g^2_a$, $g^3_a$, and $g^4_a$) and three quantized gains ($g^1_a$, $g^2_a$, and $g^3_a$) of each subframe, respectively. The index location of the quantized pitch gain ($g^k_a$) 496 within the pre gain quantization table represents the adaptive gain component 148*b* for the full-rate codec 22 or the adaptive gain component 180*b* for the half-rate codec 24. The quantized pitch gain ($g^k_a$) 496 is provided to the F1 second subframe-processing module 74 or the H1 second subframe-processing module 84.

Sub-frame Processing Module

The F1 or H1 subframe-processing module 74 or 84 uses the pitch track 348 to identify an adaptive codebook vector ($v^k_a$) 498. The adaptive codebook vector ($V^k_a$) 498 represents the adaptive codebook for each subframe where k is the subframe number. In one embodiment, there are four subframes for the full-rate codec 22 and three subframes for the half-rate codec 24 which correspond to four vectors ($v^1_a$, $v^2_a$, $v^3_a$, and $v^4_a$) and three vectors ($v^1_a$, $v^2_a$, and $v^3_a$) for the adaptive codebook contribution for each subframe, respectively.

The adaptive codebook vector ($v^k_a$) 498 and the quantized pitch gain ($\hat{g}^k_a$) 496 are multiplied by a first multiplier 456. The first multiplier 456 generates a signal that is processed by the first synthesis filter 460 and the first perceptual weighting filter module 464 to provide a first resynthesized speech signal 500. The first synthesis filter 460 receives the quantized LPC coefficients $A_q(z)$ 342 from an LSF quantization module (not shown) as part of the processing. The first subtractor 468 subtracts the first resynthesized speech signal 500 from the modified weighted speech 350 provided by a pitch pre-processing module (not shown) to generate a long-term error signal 502.

The F1 or H1 subframe-processing module 74 or 84 also performs a search for the fixed codebook contribution that is similar to that performed by the F0 and H0 subframe-processing modules 70 and 80 previously discussed. Vectors for a fixed codebook vector ($v^k_c$) 504 that represents the long-term error for a subframe are selected from the fixed codebook 390 during the search. The second multiplier 458 multiplies the fixed codebook vector ($v^k_c$) 504 by a gain ($g^k_c$) 506 where k equals the subframe number. The gain ($g^k_c$) 506 is unquantized and represents the fixed codebook gain for each subframe. The resulting signal is processed by the second synthesis filter 462 and the second perceptual weighting filter 466 to generate a second resynthesized speech signal 508. The second resynthesized speech signal 508 is subtracted from the long-term error signal 502 by the second subtractor 470 to produce a fixed codebook error signal 510.

The fixed codebook error signal 510 is received by the first minimization module 472 along with the control information 356. The first minimization module 472 operates in the same manner as the previously discussed second minimization module 400 illustrated in FIG. 6. The search process repeats until the first minimization module 472 has selected the best vector for the fixed codebook vector ($v^k_c$) 504 from the fixed codebook 390 for each subframe. The best vector for the fixed codebook vector ($v^k_c$) 504 minimizes the energy of the fixed codebook error signal 510. The indices identify the best vector for the fixed codebook vector ($v^k_c$) 504, as previously discussed, and form the fixed codebook component 146*b*, 178*b*.

Type 1 Fixed Codebook Search for Full-rate Codec

In one embodiment, the 8-pulse codebook 162, illustrated in FIG. 4, is used for each of the four subframes for frames of type 1 by the full-rate codec 22. The target for the fixed codebook vector ($v^k_c$) 504 is the long-term error signal 502. The long-term error signal 502, represented by t'(n), is determined based on the modified weighted speech 350, represented by t(n), with the adaptive codebook contribution from the initial frame processing module 44 removed according to:

$$t'(n) = t(n) - g_a \cdot (v_a(n) * h(n)). \qquad \text{(Equation 7)}$$

where $$v_a(n) = \sum_{i=-10}^{10} w_s(f(L_p(n)), I) \cdot e(n - I(L_p(n)) + I)$$

and where t'(n) is the target for a fixed codebook search, t(n) is a target signal, $g_a$ is an adaptive codebook gain, h(n) is an impulse response of a perceptually weighted synthesis filter, e(n) is past excitation, $I(L_p(n))$ is the integer part of a pitch lag and $f(L_p(n))$ is a fractional part of a pitch lag, and $w_s(f, i)$ is a Hamming weighted Sinc window.

A single codebook of 8 pulses with $2^{30}$ entries is used for each of the four subframes for frames of type 1 coding by the full-rate codec. In this example, there are 6 tracks with 8 possible locations for each track (3 bits each) and two tracks with 16 possible locations for each track (4 bits each). 4 bits are used for signs. 30 bits are provided for each subframe of type-1 full rate codec processing. The location where each of the pulses can be placed in the 40-sample subframe is limited to tracks. The tracks for the 8 pulses are given by:

Pulse 1: {0, 5, 10, 15, 20, 25, 30, 35, 2, 7, 12, 17, 22, 27, 32, 37}
Pulse 2: {1, 6, 11, 16, 21, 26, 31, 36}
Pulse 3: {3, 8, 13, 18, 23, 28, 33, 38}
Pulse 4: {4, 9, 14, 19, 24, 29, 34, 39}
Pulse 5: {0, 5, 10, 15, 20, 25, 30, 35, 2, 7, 12, 17, 22, 27, 32, 37}
Pulse 6: {1, 6, 11, 16, 21, 26, 31, 36}
Pulse 7: {3, 8, 13, 18, 23, 28, 33, 38}
Pulse 8: {4, 9, 14, 19, 24, 29, 34, 39}.

Figure 16:
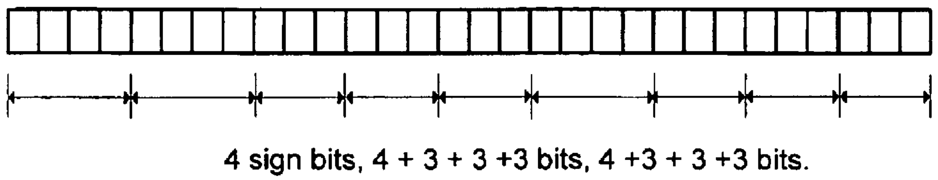
FIG. 16 is a schematic diagram of a subcodebook structure.

The track for the $1^{st}$ pulse is the same as the track for the $5^{th}$ pulse, the track for the $2^{nd}$ pulse is the same as the track for the $6^{th}$ pulse, the track for the $3^{rd}$ pulse is the same as the track for the $7^{th}$ pulse, and the track for the $4^{th}$ pulse is the same as the track for the $8^{th}$ pulse. Similar to the discussion for the first subcodebook for the type 0 frames, the selected pulse locations are usually not the same. Since there are 16 possible locations for Pulse 1 and Pulse 5, each is represented with 4 bits. Since there are 8 possible locations for Pulse 2 through Pulse 8, each is represented with 3 bits. One bit is used to represent the combined sign of the Pulse 1 and Pulse 5 (Pulse 1 and Pulse 5 have the same absolute magnitude and their selected locations can be exchanged). 1 bit is used to represent the combined sign of Pulse 2 and Pulse 6, 1 bit is used to represent the combined sign of Pulse 3 and Pulse 7, and 1 bit to represent the combined sign of Pulse 4 and Pulse 8. The combined sign uses the redundancy of the information in the pulse locations. Therefore, the overall bit stream for this codebook comprises of 1+1+1+1+4+3+3+3+4+3+3+3=30 bits. This subcodebook structure is illustrated in FIG. 16.

Type 1 Fixed Codebook Search for Half-rate Codec

In one embodiment, the long-term error is represented with 13 bits for each of the three subframes for frames classified as Type One for the half-rate codec 24. The long-term error signal may be determined in a similar manner to the fixed codebook search in the full-rate codec 22. Similar to the fixed-codebook search for the half-rate codec 24 for frames of Type Zero, high-frequency noise injection, additional pulses determined by high correlation in the previous subframe, and a weak short-term spectral filter may be introduced into the impulse response of the second synthesis filter 462. In addition, pitch enhancement may be also introduced into the impulse response of the second synthesis filter 462.

In the half-rate Type One codec, adaptive and fixed codebook gain components 180*b* and 182*b* may also be generated similarly to the full-rate codec 22 using multi-dimensional vector quantizers. In one embodiment, a three-dimensional pre vector quantizer (3D preVQ) and a three-dimensional delayed vector quantizer (3D delayed VQ) are used for the adaptive and fixed gain components 180*b*, 182*b*, respectively. Each multi-dimensional gain table in one embodiment comprises 3 elements for each subframe of a frame classified as Type One. Similar to the full-rate codec, the pre vector quantizer for the adaptive gain component 180*b* quantizes directly the adaptive gains, and similarly the delayed vector quantizer for the fixed gain component 182*b* quantizes the fixed codebook energy prediction error. Different prediction coefficients are used to predict the fixed codebook energy for each subframe. The predicted fixed codebook energies of the first, the second, and the third subframe are predicted from the 3 quantized fixed codebook energy errors of the previous frame using, respectively, the set of coefficients {0.6, 0.3, 0.1}, {0.4, 0.25, 0.1}, and {0.3, 0.15, 0.075}.

In one embodiment, the H1 codec uses two subcodebooks and in another embodiment, uses three subcodebooks. The first two subcodebooks are the same in either embodiment. The fixed codebook excitation is represented with 13 bits for each of the three subframes for frames of type 1 by the half-rate codec. The first codebook has 2 pulses, the second codebook has 3 pulses, and a third codebook has 5 pulses. The codebook, the pulse locations, and the pulse signs are encoded with 13 bits for each subframe. The size of the first two subframes is 53 samples, and the size of the last subframe is 54 samples. The first bit in the bit stream indicates whether the first codebook (12 bits) is used, or whether the second or third subcodebook (each 11 bits) is used. If the first bit is set to '1' the first codebook is used, if the first bit is set to '0', either the second codebook or the third codebook is used. If the first bit is set to '1', all the remaining 12 bits are used to describe the pulse locations and signs for the first codebook. If the first bit is set to '0', the second bit indicates if the second codebook is used, or the third codebook is used. If the second bit is set to '1', the second codebook is used, and if the second bit is set to '0', the third codebook is used. In either case, the remaining 11 bits are used to describe the pulse locations and signs for the second codebook or the third codebook. If there is no third subcodebook, the second bit is always set to "1".

For the 2-pulse subcodebook 193 (from FIG. 5) of $2^{12}$ entries, each pulse is restricted to a track where 5 bits specify the position in the track and 1 bit specifies the sign of the pulse. The tracks for the 2 pulses are given by Pulse 1: {0, 1, 2, 3, 4, 5, 6, 7, 8, 9, 10, 12, 14, 16, 18, 20, 22, 24, 26, 28, 30, 32, 34, 36, 38, 40, 42, 44, 46, 48, 50, 52}
Pulse 2: {1, 3, 5, 7, 9, 11, 12, 13, 14, 15, 16, 17, 18, 19, 20, 21, 22, 23, 25, 27, 29, 31, 33, 35, 37, 39, 41, 43, 45, 47, 49, 51}.

Figure 17:
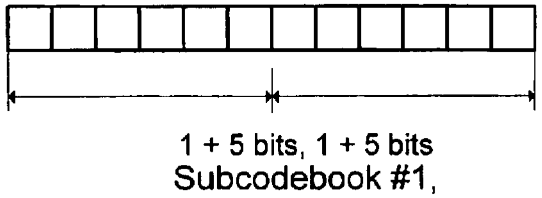
FIG. 17 is a schematic diagram of a subcodebook structure.

Since the number of locations is 32, each pulse may be encoded using 5 bits. Two bits define the sign for each bit. Therefore, the overall bit stream for this codebook comprises of 1+5+1+5=12 bits (Pulse 1 sign, Pulse location, Pulse 2 sign, Pulse 2 location). This structure is shown in FIG. 17.

For the second subcodebook, the 3-pulse subcodebook 195 (from FIG. 5) of $2^{12}$ entries, the location of each of the three pulses in the 3-pulse codebook for frames of type 1 is limited to special tracks. The combination of a phase and the individual relative displacement for each of the three pulses generate the tracks. The phase is defined by 3 bits, and the relative displacement for each pulse is defined by 2 bits per phase. The phase (the starting point for placing the 3 pulses) and the relative location of the pulses are given by:

| | |
|---|---|
| Phase: | 0, 5, 11, 17, 23, 29, 35, 41. |
| Pulse 1: | 0, 3, 6, 9 |
| Pulse 2: | 1, 4, 7, 10 |
| Pulse 3: | 2, 5, 8, 11. |

Figure 18:
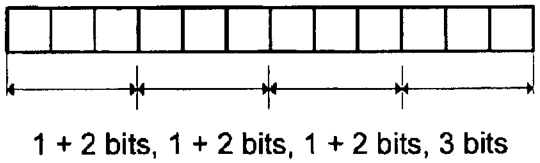
FIG. 18 is a schematic diagram of a subcodebook structure.

The first subcodebook is fully searched followed by a full search of the second subcodebook. The subcodebook and the vector that result in the maximum criterion value are selected. The overall bit stream for this second codebook comprises 3 (phase)+2 (pulse 1)+2 (pulse 2)+2 (pulse 3)+3 (sign bits)=12 bits, where the three pulses and their sign bits precede the phase location of 4 bits. FIG. 18 illustrates this subcodebook structure.

In another embodiment, we split the above second subcodebook again into two subcodebooks. That is, both the second subcodebook and the third subcodebook have $2^{11}$ entries, respectively. Now, for the second subcodebook with 3 pulses, the location of each pulse for frames of Type 1 is limited to special tracks. The position of the first pulse is coded with a fixed track and the positions of the remaining two pulses are coded with dynamic tracks, which are relative to the selected position of the first pulse. The fixed track for the first pulse and the relative tracks for the other two tracks are defined as follows:

| |
|---|
| Pulse 1: 3, 6, 9, 12, 15, 18, 21, 24, 27, 30, 33, 36, 39, 42, 45, 48. |
| Pulse 2: $Pos_1-3$, $Pos_1-1$, $Pos_1+1$, $Pos_1+3$ |
| Pulse 3: $Pos_1-2$, $Pos_1$, $Pos_1+2$, $Pos_1+4$ |

Of course, the dynamic tracks must be limited on the subframe range.

The third subcodebook comprises 5 pulses, each confined to a fixed track, and each pulse has a unique sign. The tracks for the 5 pulses are:

| |
|---|
| Pulse 1: 0, 15, 30 45 |
| Pulse 2: 0, 5 |
| Pulse 3: 10, 20 |
| Pulse 4: 25, 35 |
| Pulse 5: 40, 50. |

Figure 19:
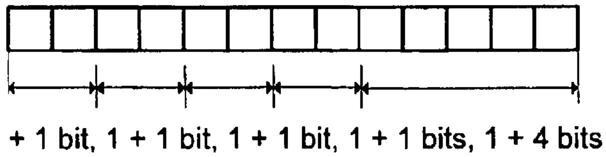
FIG. 19 is a schematic diagram of a subcodebook structure.

The overall bit stream for this third subcodebook comprises 11 bits, =2 (pulse 1)+1 (pulse 2)+1 (pulse 3)+1 (pulse 4)+1 (pulse 5)+5 (signs). This structure is shown in FIG. 19.

In one embodiment, a full search is performed for the 2-pulse subcodebook 193 the 3-pulse subcodebook 195, and the 5-pulse subcodebook 197 as illustrated in FIG. 5. In other embodiments, the fast search approach previously described can be also used. The pulse codebook and the best vector for the fixed codebook vector ($v^k_c$) 504 that minimizes the fixed codebook error signal 510 are selected for the representation of the long term residual for each subframe. In addition, an initial fixed codebook gain represented by the gain ($g^k_c$) 506 may be determined during the search similar to the full-rate codec 22. The indices identify the best vector for the fixed codebook vector ($v^k_c$) 504 and form the fixed codebook component 178*b*.

In one embodiment, a codevector is constructed by selecting two first pulses jointly, determining the locations, signs and magnitudes of the first two pulses. Then a next two pulses are selected, determining the locations, signs and magnitudes of those two pulses, and so on to the last two pulses. The first two pulses may be represented by $P_1$, $P_2$, the next two by $P_i$, $P_{i+1}$, and the last two by $P_{n-1}$ and $P_n$. A codevector is then constructed by selecting a combination of pulses from at least one searching turn, preferably more than one, where each turn uses a sequential search from the first pair to the last, and where a next searching turn yields a better result than the previous one.

Special Searching Approach for Fixed Codebook

The principles of the new fast searching approach have been described above, with reference to FIGS. 7–8. This section will give more detailed information concerning the searching. In order to help understanding of the advantages of the special searching approach, the basic searching criterion and the traditional approach are summarized first.

1) The Criterion

The criterion to search for a fixed codebook or subcodebook, or within a fixed codebook or subcodebook for the best codevector in CELP speech coding is to maximize the following criterion value:

$$F(i) = \frac{(T \cdot Y_i^t)^2}{Y_i \cdot Y_i^t} \quad \text{(Equation 8)}$$

where T is a target vector of 1×L elements for the fixed codebook search, L is a subframe length, $Y_i$ is a filtered vector of 1×L elements, $$Y_i = C_i \cdot H \quad (9)$$

where $C_i$ is a candidate codevector of 1×L elements from the fixed codebook or subcodebook (the symbol C is equivalent to $V_c$ in the previous section), i is the index which defines the codevector, H is a square array or matrix of L×L elements, which represents the impulsive responses of a weighted synthesis filter with all kinds of excitation enhancements to an excitation unit pulse at a different location. The searching objective is to select an index of i by maximizing F(i) of the equation (8).

2) The Traditional Searching Approach

Substituting (9) into (8) yields $$\begin{aligned} F(i) &= \frac{(T \cdot Y_i^t)^2}{Y_i \cdot Y_i^t} \quad (10) \\ &= \frac{(T \cdot H^t \cdot C_i^t)^2}{C_i \cdot H \cdot H^t \cdot C_i^t} \\ &= \frac{(B \cdot C_i^t)^2}{C_i \cdot \Phi \cdot C_i^t} \end{aligned}$$

in which $$B = T \cdot H^t \quad (11)$$

is a weighted target vector of 1×L elements and $$\Phi = H \cdot H^t \quad (12)$$

a square weighting matrix of L×L elements, in which both H and its transform $H^t$ are square matrices or arrays of dimension L. Both B and Φ may be pre-calculated and stored in memory. Because $C_i$ usually contains many zero values for the pulse codebook or subcodebook, the computational complexity of the numerator of (10) tends to be much lower than that of the denominator. The disadvantages of this traditional way include (a) requiring large memory storage for the matrix Φ when the subframe size L is large (such as L=80) and (b) dealing with a significant computational load for the denominator when the codebook structure is large. Although the matrix H contains only L different elements and can be represented by a simple vector of 1×L, Φ is much more complex and includes (L×L/2) different elements. In order to overcome the above disadvantages without hurting the searching performance, the new searching method uses an iterative searching approach without using the matrix Φ. It is clear that Φ will be a matrix or an array of potentially very large size and complexity, since it will be both of large order and have many non-zero elements, especially in cases where there are large subframe sizes, and a complex codevector is used. In computing Φ and its transform, a very great amount of data will have to be committed to memory, that is, stored in some memory module of the speech compression system. This resource will be required once the dimension of the array or matrix grows beyond 2 or 3 (where 2 means a 2×2 matrix, 3 means a 3×3 matrix, etc.).

3) The New Searching Method

Equation (10) can be re-written as follows:

$$F(i) = \frac{(T \cdot Y_i^t)^2}{Y_i \cdot Y_i^t} = \frac{(T \cdot H^t \cdot C_i^t)^2}{Y_i \cdot Y_i^t} = \frac{(B \cdot C_i^t)^2}{Y_i \cdot Y_i^t} = \frac{(B \cdot C_i^t)^2}{D_i} \tag{13}$$

Vector B can be precalculated in the manner mentioned above, filtering the target vector without committing the Matrix H to memory. Nor does the transform of H, $H^t$ need to be stored, nor the matrix Φ. The computation of the numerator of the equation (13) is already fast during the search since $C_i$ contains an abundance of zeros. The denominator of the equation (13) can then be recalculated in a recursive way by changing only one pulse position in the innermost searching loop. This iterative searching approach was described in the previous sections. Using this method, the total number of the required computations of the criterion value F(i) is significantly reduced and each computation of F(i) is done quickly. More detailed information given here concerns the computation of the denominator, which may be expressed as:

$$\begin{aligned} D_i &= Y_i \cdot Y_i^t \\ &= (Y_{old} + Y_{new}(i)) \cdot (Y_{old} + Y_{new}(i))^t \\ &= Y_{old} \cdot Y_{old}^t + 2 \cdot Y_{old} \cdot Y_{new}(i)^t + Y_{new}(i) \cdot Y_{new}(i)^t \\ &= D_{old} + 2 \cdot Y_{old} \cdot Y_{new}(i)^t + D_{new}(i) \end{aligned} \tag{14}$$

in which $$\begin{aligned} Y_i &= (C_{old} + C_{new}(i)) \cdot H \\ &= C_{old} \cdot H + C_{new}(i) \cdot H \\ &= Y_{old} + Y_{new}(i) \end{aligned} \tag{15}$$

and in which $C_{new}(i)$ is a vector of 1×L elements. This vector governs the innermost searching loop and contains only one non-zero element at the position of the current pulse to be searched. This pulse position usually moves from left to right with increasing the index i. Consequently, in the innermost computation loop, the vector $$Y_{new}(i) = C_{new}(i) \cdot H \tag{16}$$

can be easily obtained by shifting the previous candidate vector $Y_{new}(i-1)$. If the search method also uses backward pitch enhancement (see previous sections and referenced U.S. Provisional Application No. 60/232,938, filed Sep. 15, 2000 and the impulsive responses in H are not causal, Ynew(i) still can be updated by shifting the previous candidate and considering the occasional contribution from the incoming backward pitch pulse.

In this searching approach, a different pulse even at the same position may generate a same filtered vector of (16), possibly with a different sign, that is, positive or negative. Therefore, in (14), the last term, representing the energy of the filtered signal excited by one pulse, $$D_{new}(i) = Y_{new}(i) \cdot Y_{new}(i)^t \tag{17}$$

has a very limited number of possible values (the sign does not influence the value of (17) ) which can be pre-calculated in an iterative manner by shifting the filtered signal.

In (15), $C_{old}$ is a vector of 1×L elements, which is not changed in the innermost searching loop and contains non-zero elements at the positions of all the other pulses (except the current pulse) temporally determined during the previous searching. Therefore, in equation (14)

$$D_{old} = Y_{old} \cdot Y_{old}^t \tag{18}$$

is a constant because $$Y_{old} = C_{old} \cdot H \tag{19}$$

is not changed in the innermost searching loop.

The middle term in the equation (14) may be more computationally complex, but remains a simple correlation. $Y_{new}(i)$ and $Y_{old}$ may also include many zero values at the beginning of the vectors, making the correlation computation easier. This middle term also could be calculated in an iterative way with more memory capabilities.

After finishing the innermost searching loop, $Y_{old}$ is updated by adding the contribution (the selected $Y_{new}(i)$) of the current pulse and removing the contribution of the next pulse to be searched if the next pulse already has a temporally determined position; then $D_{old}$ is to be updated before entering the innermost searching loop.

It is thus seen that the new method is most advantageous when used on pulse-type codevectors having at least two pulses, and that in calculating the criterion, the location, sign (positive or negative) and magnitude of each pulse will help determine the criterion, or the weighted mean square error, the fixed codebook error signal. In every searching turn, a codevector is selected by selected a combination of pulses in one or preferably, more than one, searching turn. In a pulse codebook having N pulses, a codevector selected will also have N pulses selected from locations in the fixed codebook or subcodebooks.

Decoding System

Figure 20:
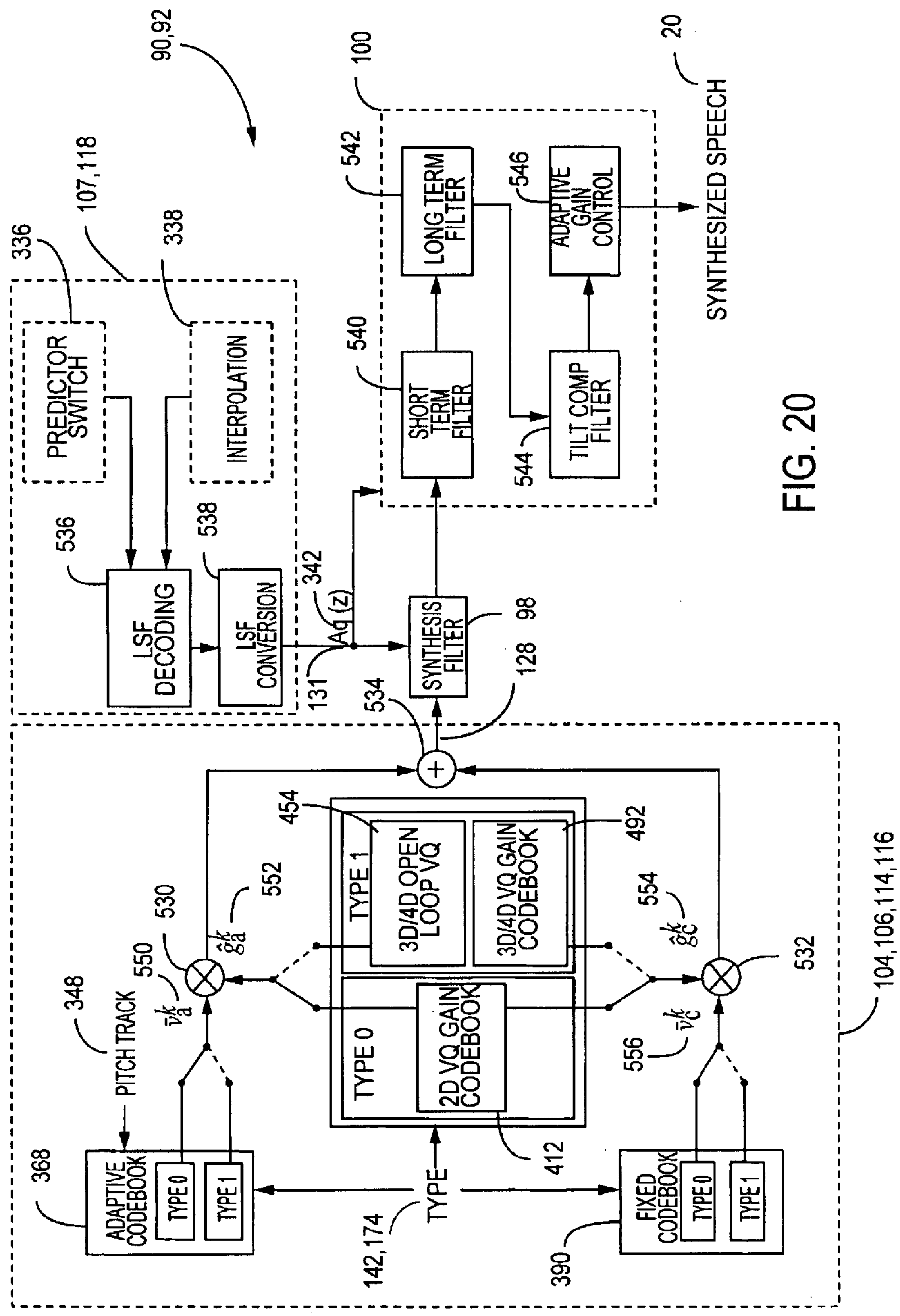
FIG. 20 is an extended block diagram of the decoding system of FIG. 2.

Referring now to FIG. 20, a functional block diagram represents the full and half-rate decoders 90 and 92 of FIG. 3. The full or half-rate decoders 90 or 92 include the excitation reconstruction modules 104, 106, 114 and 116 and the linear prediction coefficient (LPC) reconstruction modules 107 and 118. One embodiment of the excitation reconstruction modules 104, 106, 114 and 116 include the adaptive codebook 368, the fixed codebook 390, the 2D VQ gain codebook 412, the 3D/4D open loop VQ codebook 454 and the 3D/4D VQ gain codebook 492. The excitation reconstruction modules 104, 106, 114 and 116 also include a first multiplier 530, a second multiplier 532 and an adder 534. In one embodiment, the LPC reconstruction modules 107 and 118 include an LSF decoding module 536 and an LSF conversion module 538. In addition, the half-rate codec 24 includes the predictor switch module 336 and the full-rate codec 22 includes the interpolation module 338.

The decoders 90, 92, 94 and 96 receive the bitstream as shown in FIG. 4, and decode the signal to reconstruct different parameters of the speech signal 18. The decoders decode each frame as a function of the rate selection and classification. The rate selection is provided from the encoding system to the decoding system 16 by an external signal in a control channel in a wireless telecommunication system.

Also illustrated in FIG. 20 are the synthesis filter module 98 and the post-processing module 100. In one embodiment, the post-processing module 100 includes a short-term filter module 540, a long-term filter module 542, a tilt compensation filter module 544 and an adaptive gain control module 546. According to the rate selection, the bit-stream may be decoded to generate post-processed synthesized speech 20. The decoders 90 and 92 perform inverse mapping of the components of the bit-stream to algorithm parameters. The inverse mapping may be followed by a type classification dependent synthesis within the full and half-rate codecs 22 and 24.

The decoding for the quarter-rate codec 26 and the eighth-rate codec 28 are similar to the full and half-rate codecs 22 and 24. However, the quarter and eighth-rate codecs 26 and 28 use vectors of similar yet random numbers and the energy gain, as previously discussed, instead of the adaptive and the fixed codebooks 368 and 390 and associated gains. The random numbers and the energy gain may be used to reconstruct an excitation energy that represents the short-term excitation of a frame. The LPC reconstruction modules 122 and 126 are also similar to the full and half-rate codec 22 and 24 with the exception of the predictor switch module 336 and the interpolation module 338.

Within the full and half rate decoders 90 and 92, operation of the excitation reconstruction modules 104, 106, 114 and 116 is largely dependent on the type classification provided by the type component 142 and 174. The adaptive codebook 368 receives the pitch track 348. The pitch track 348 is reconstructed by the decoding system 16 from the adaptive codebook components 144 and 176 provided in the bitstream by the encoding system 12. Depending on the type classification provided by the type components 142 and 174, the adaptive codebook 368 provides a quantized adaptive codebook vector ($v^k_a$) 550 to the multiplier 530. The multiplier 530 multiplies the quantized adaptive codebook vector ($v^k_a$) 550 with a gain vector ($g^k_a$) 552. The selection of the gain vector ($g^k_a$) 552 also depends on the type classification provided by the type components 142 and 174.

In an example embodiment, if the frame is classified as Type Zero in the full rate codec 22, the 2D VQ gain codebook 412 provides the adaptive codebook gain ($g^k_a$) 552 to the multiplier 530. The adaptive codebook gain ($g^k_a$) 552 is determined from the adaptive and fixed codebook gain components 148*a* and 150*a*. The adaptive codebook gain ($g^k_a$) 552 is the same as part of the best vector for the quantized gain vector ($\hat{g}_{ac}$) 433 determined by the gain and quantization section 366 of the F0 sub-frame processing module 70 as previously discussed. The quantized adaptive codebook vector ($v^k_a$) 550 is determined from the closed loop adaptive codebook component 144*b*. Similarly, the quantized adaptive codebook vector ($v^k_a$) 550 is the same as the best vector for the adaptive codebook vector ($v_a$) 382 determined by the F0 sub-frame processing module 70.

The 2D VQ gain codebook 412 is two-dimensional and provides the adaptive codebook gain ($g^k_a$) 552 to the multiplier 530 and a fixed codebook gain ($g^k_c$) 554 to the multiplier 532. The fixed codebook gain ($g^k_c$) 554 is similarly determined from the adaptive and fixed codebook gain components 148*a* and 150*a* and is part of the best vector for the quantized gain vector ($\hat{g}_{ac}$) 433. Also based on the type classification, the fixed codebook 390 provides a quantized fixed codebook vector ($v^k_c$) 556 to the multiplier 532. The quantized fixed codebook vector ($v^k_c$) 556 is reconstructed from the codebook identification, the pulse locations, and the pulse signs, or the gaussian codebook for the half-rate codec, provided by the fixed codebook component 146*a*. The quantized fixed codebook vector ($v^k_c$) 556 is the same as the best vector for the fixed codebook vector ($v_c$) 402 determined by the F0 sub-frame processing module 70 as previously discussed. The multiplier 532 multiplies the quantized fixed codebook vector ($v^k_c$) 556 by the fixed codebook gain ($g^k_c$) 554.

If the type classification of the frame is Type One, a multi-dimensional vector quantizer provides the adaptive codebook gain ($g^k_a$) 552 to the multiplier 530. Where the number of dimensions in the multi-dimensional vector quantizer is dependent on the number of subframes. In one embodiment, the multi-dimensional vector quantizer may be the 3D/4D open loop VQ 454. Similarly, a multi-dimensional vector quantizer provides the fixed codebook gain ($g^k_c$) 554 to the multiplier 532. The adaptive codebook gain ($g^k_a$) 552 and the fixed codebook gain ($g^k_c$) 554 are provided by the gain components 147 and 179 and are the same as the quantized pitch gain ($\hat{g}^k_a$) 496 and the quantized fixed codebook gain ($\hat{g}^k_c$) 513, respectively.

In frames classified as Type Zero or Type One, the output from the first multiplier 530 is received by the adder 534 and is added to the output from the second multiplier 532. The output from the adder 534 is the short-term excitation. The short-term excitation is provided to the synthesis filter module 98 on the short-term excitation line 128.

The generation of the short-term (LPC) prediction coefficients in the decoders 90 and 92 are similar to the processing in the encoding system 12. The LSF decoding module 536 reconstructs the quantized LSFs from the LSF components 140 and 172. The LSF decoding module 536 uses the same LSF quantization table and LSF predictor coefficients tables used by the encoding system 12. For the half-rate codec 24, the predictor switch module 336 selects one of the sets of predictor coefficients, to calculate the predicted LSFs as directed by the LSF components 140 and 172. Interpolation of the quantized LSFs occurs using the same linear interpolation path used in the encoding system 12. For the full-rate codec 22 for frames classified as Type Zero, the interpolation module 338, selects the one of the same interpolation paths used in the encoding system 12 as directed by the LSF components 140 and 172. The weighting of the quantized LSFs is followed by conversion to the quantized LPC coefficients $A_q(z)$ 342 within the LSF conversion module 538. The quantized LPC coefficients $A_q(z)$ 342 are the short-term prediction coefficients that are supplied to the synthesis filter 98 on the short-term prediction coefficients line 131.

The quantized LPC coefficients $A_q(z)$ 342 may be used by the synthesis filter 98 to filter the short-term prediction coefficients. The synthesis filter 98 is a short-term inverse prediction filter that generates synthesized speech that is not post-processed. The non-post-processed synthesized speech may then be passed through the post-processing module 100. The short-term prediction coefficients may also be provided to the post-processing module 100.

The long term filter module 542 performs a fine tuning search for the pitch period in the synthesized speech. In one embodiment, the fine tuning search is performed using pitch correlation and rate-dependent gain controlled harmonic filtering. The harmonic filtering is disabled for the quarter-rate codec 26 and the eighth-rate codec 28. The post filtering is concluded with an adaptive gain control module 546. The adaptive gain control module 546 brings the energy level of the synthesized speech that has been processed within the post-processing module 100 to the level of the unfiltered synthesized speech. Some level smoothing and adaptations may also be performed within the adaptive gain control module 546. The result of the filtering by the post-processing module 100 is the synthesized speech 20.

Embodiments

One implementation of an embodiment of the speech compression system 10 may be in a Digital Signal Processing (DSP) chip. The DSP chip may be programmed with source code. The source code may be first translated into fixed point, and then translated into the programming language that is specific to the DSP. The translated source code may then be downloaded into the DSP and run therein.

Figure 21:
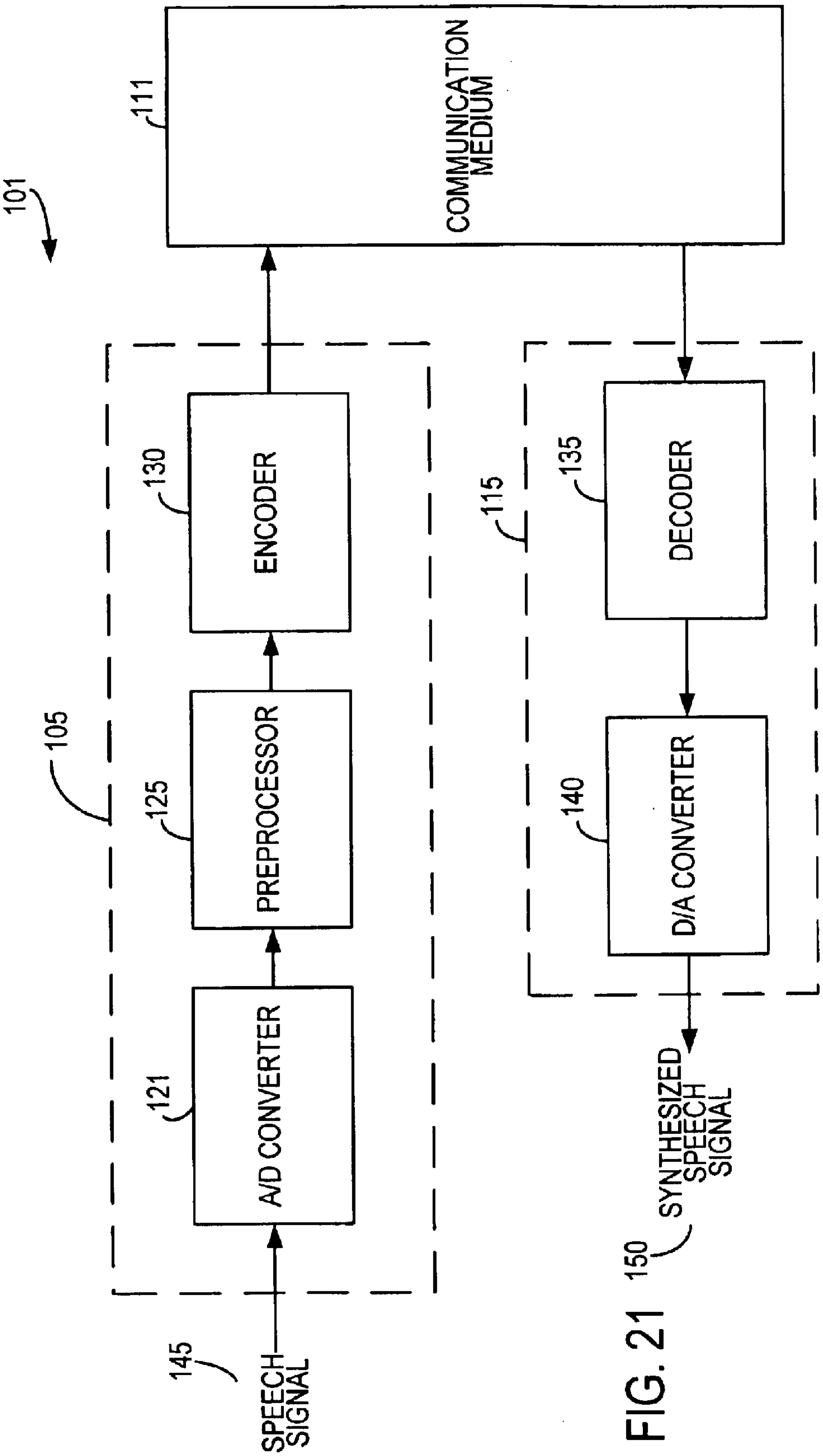
FIG. 21 is a block diagram of a speech coding system.

FIG. 21 is a block diagram of a speech coding system 101 with according to one embodiment that uses pitch gain, a fixed subcodebook and at least one additional factor for encoding. The speech coding system 101 includes a first communication device 105 operatively connected via a communication medium 111 to a second communication device 115. The speech coding system 101 may be any cellular telephone, radio frequency, or other telecommunication system capable of encoding a speech signal 145 and decoding the encoded signal to create synthesized speech 150. The communications devices 105, 115 may be cellular telephones, portable radio transceivers, and the like.

The communications medium 111 may include systems using any transmission mechanism, including radio waves, infrared, landlines, fiber optics, any other medium capable of transmitting digital signals (wires or cables), or any combination thereof. The communications medium 111 may also include a storage mechanism including a memory device, a storage medium, or other device capable of storing and retrieving digital signals. In use, the communications medium 111 transmits a bitstream of digital between the first and second communications devices 105, 115.

The first communication device 105 includes an analog-to-digital converter 121, a preprocessor 125, and an encoder 130 connected as shown. The first communication device 105 may have an antenna or other communication medium interface (not shown) for sending and receiving digital signals with the communication medium 111. The first communication device 105 may also have other components known in the art for any communication device, such as a decoder or a digital-to-analog converter.

The second communication device 115 includes a decoder 135 and digital-to-analog converter 140 connected as shown. Although not shown, the second communication device 115 may have one or more of a synthesis filter, a postprocessor, and other components. The second communication device 115 also may have an antenna or other communication medium interface (not shown) for sending and receiving digital signals with the communication medium. The preprocessor 125, encoder 130, and decoder 135 comprise processors, digital signal processors (DSPs) application specific integrated circuits, or other digital devices for implementing the coding and algorithms discussed herein. The preprocessor 125 and encoder 130 may comprise separate components or the same component.

In use, the analog-to-digital converter 121 receives a speech signal 145 from a microphone (not shown) or other signal input device. The speech signal may be voiced speech, music, or another analog signal. The analog-to-digital converter 121 digitizes the speech signal, providing the digitized speech signal to the preprocessor 125. The preprocessor 125 passes the digitized signal through a high-pass filter (not shown) preferably with a cutoff frequency of about 60–80 Hz. The preprocessor 125 may perform other processes to improve the digitized signal for encoding, such as noise suppression. The encoder 130 codes the speech using a pitch lag, a fixed codebook, a fixed codebook gain, LPC parameters, and other parameters. The code is transmitted in the communication medium 111.

The decoder 135 receives the bitstream from the communication medium 111. The decoder operates to decode the bitstream and generate a synthesized speech signal 150 in the form of a digitized signal. The synthesized speech signal 150 is converted to an analog signal by the digital-to-analog converter 140. The encoder 130 and the decoder 135 use a speech compression system, commonly called a codec, to reduce the bit rate of the noise-suppressed digitized speech signal. For example, the code excited linear prediction (CELP) coding technique utilizes several prediction techniques to remove redundancy from the speech signal.

While an embodiment of the invention comprises the specific modes mentioned above, the invention is not limited to this embodiment. Thus, a mode may be selected from among more than 3 modes or less than 3 modes. For instance, another embodiment may select from among 5 modes, Mode 0, Mode 1 and Mode 2, as well as Mode 3 and Mode Half-Rate Max. Still another embodiment of the invention may encompass a mode of no transmission, when the transmission circuits are being used at their full capacity. While preferably implemented in the context of a G.729 standard, other embodiments and implementations may be encompassed by this invention.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A speech coding system comprising:

a speech processing circuitry disposed to receive a speech waveform, where the speech processing circuitry comprises a codebook having a plurality of subcodebooks with at least two different subcodebooks, where each subcodebook comprises a plurality of pulse locations for generation of at least one codevector in response to the speech waveform, and where the plurality of subcodebooks comprise:

a first subcodebook to provide a first codevector comprising a first pulse and a second pulse; and a second subcodebook to provide a second codevector comprising a third pulse, a fourth pulse, and a fifth pulse.

2. The speech coding system according to claim 1, where the plurality of subcodebooks comprise at least one of a pulse-like subcodebook and a noise-like subcodebook.

3. The speech coding system according to claim 1, where the at least one codevector is one of pulse-like and noise-like.

4. The speech coding system according to claim 1, where the plurality of pulse locations comprise at least one track, and where the at least one codevector comprises at least one pulse selected from the at least one track.

5. The speech coding system according to claim 4, where the at least one pulse comprises a first pulse and a second pulse, where the at least one track comprises a first track and a second track, and where the first pulse is selected from the first track and the second pulse is selected from the second track.

6. The speech coding system according to claim 5, where the at least one pulse further comprises a third pulse, where the at least one track further comprises a third track, and where the third pulse is selected from the third track.

7. The speech coding system according to claim 6, where at least one pulse location of the third track is different from at least one pulse location of at least one of the first track and the second track.

8. The speech coding system of claim 1, where the plurality of subcodebooks further comprises:

a third subcodebook to provide a third codevector comprising a sixth pulse, a seventh pulse, an eighth pulse, a ninth pulse, and a tenth pulse.

9. The speech coding system of claim 8, where the first subcodebook comprises a first track and a second track;

where the second subcodebook comprises a third track, a fourth track, and a fifth track;

where the third subcodebook comprises a sixth track, a seventh track, an eighth track, a ninth track, and a tenth track;

where the first pulse is selected from the first track;

where the second pulse is selected from the second track;

where the third pulse is selected from the third track;

where the fourth pulse is selected from the fourth track;

where the fifth pulse is selected from the fifth track;

where the sixth pulse is selected from the sixth track;

where the seventh pulse is selected from the seventh track;

where the eighth pulse is selected from the eighth track;

where the ninth pulse is selected from the ninth track; and where the tenth pulse is selected from the tenth track.

10. The speech coding system of claim 9, where the first track comprises pulse locations
0, 1, 2, 3, 4, 5, 6, 7, 8, 9, 10, 12, 14, 16, 18, 20, 22, 24, 26, 28, 30, 32, 34, 36, 38, 40, 42, 44, 46, 48, 50, 52;

where the second track comprises pulse locations
1, 3, 5, 7, 9, 11, 12, 13, 14, 15, 16, 17, 18, 19, 20, 21, 22, 23, 25, 27, 29, 31, 33, 35, 37, 39, 41, 43, 45, 47, 49, 51;

where the third track comprises pulse locations
3, 6, 9, 12, 15, 18, 21, 24, 27, 30, 33, 36, 39, 42, 45, 48;

where the fourth track comprises pulse locations
$Pos_1-3$, $Pos_1-1$, $Pos_1+1$, $Pos_1+3$;

where the fifth track comprises pulse locations
$Pos_1-2$, $Pos_1$, $Pos_1+2$, $Pos_1+4$;

where the sixth track comprises pulse locations
0, 15, 30, 45;

where the seventh track comprises pulse locations
0, 5;

where the eighth track comprises pulse locations
10, 20;

where the ninth track comprises pulse locations
25, 35;

where the tenth track comprises pulse locations
40, 50;

where the fourth and fifth tracks are dynamic, relative to $Pos_1$;

where $Pos_1$ is the determined position of the third pulse; and where $Pos_1$ is limited within the subframe.

11. The speech coding system of claim 9, where the pulse candidate locations of the fourth track, and the fifth track respectively have a relative displacement from a determined location of the third pulse.

12. The speech coding system of claim 11, where the relative displacement comprises 2 bits and the location for the third pulse comprises 4 bits.

13. A speech coding system comprising:

a speech processing circuitry disposed to receive a speech waveform, where the speech processing circuitry comprises a codebook having a plurality of subcodebooks with at least two different subcodebooks, where each subcodebook comprises a plurality of pulse locations for generation of at least one codevector in response to the speech waveform; and where the plurality of subcodebooks comprise:

a first subcodebook to provide a first codevector comprising a first pulse, a second pulse, a third pulse, a fourth pulse, and a fifth pulse;

a second subcodebook to provide a second codevector comprising a sixth pulse, a seventh pulse, an eighth pulse, a ninth pulse, and a tenth pulse; and a third subcodebook to provide a third codevector comprising an eleventh pulse, a twelfth pulse, a thirteenth pulse, a fourteenth pulse, and a fifteenth pulse.

14. The speech coding system according to claim 13, where the plurality of subcodebooks comprise at least one of a pulse-like subcodebook and a noise-like subcodebook.

15. The speech coding system according to claim 13, where the at least one codevector is one of pulse-like and noise-like.

16. The speech coding system of claim 13, where the plurality of pulse locations comprise at least one track, and where the at least one codevector comprises at least one pulse selected from the at least one track.

17. The speech coding system of claim 16, where the at least one pulse comprises a first pulse and a second pulse, where the at least one track comprises a first track and a second track, and where the first pulse is selected from the first track and the second pulse is selected from the second track.

18. The speech coding system of claim 17, where the at least one pulse further comprises a third pulse, where the at least one track further comprises a third track, and where the third pulse is selected from the third track.

19. The speech coding system of claim 18, where at least one pulse location of the third track is different from at least one pulse location of at least one of the first track and the second track.

20. The speech coding system of claim 13, where the at least one codevector is selected using criterion values calculated without storing a square array and its transform.

21. The speech coding system of claim 13, where the first subcodebook comprises a first track, a second track, a third track, a fourth track, and a fifth track;

where the second subcodebook book comprises a sixth track, a seventh track, an eighth track, a ninth track, and a tenth track;

where the third subcodebook comprises an eleventh track, a twelfth track, an thirteenth track, a fourteenth track, and a fifteenth track;

where the first pulse is selected from the first track;

where the second pulse is selected from the second track;

where the third pulse is selected from the third track;

where the fourth pulse is selected from the fourth track;

where the fifth pulse is selected from the fifth track;

where the sixth pulse is selected from the sixth track;

where the seventh pulse is selected from the seventh track where the eighth pulse is selected from the eighth track;

where the ninth pulse is selected from the ninth track;

where the tenth pulse is selected from the tenth track where the eleventh pulse is selected from the eleventh track;

where the twelfth pulse is selected from the twelfth track;

where the thirteenth pulse is selected from the thirteenth track;

where the fourteenth pulse is selected from the fourteenth track; and where the fifteenth pulse is selected from the fifteenth track.

22. The speech coding system of claim 21, where the first track comprises pulse locations
1, 3, 6, 8, 11, 13, 16, 18, 21, 23, 26, 28, 31, 33, 36, 38;

where the second track comprises pulse locations
4, 9, 14, 19, 24, 29, 34, 39;

where the third track comprises pulse locations
1, 3, 6, 8, 11, 13, 16, 18, 21, 23, 26, 28, 31, 33, 36, 38 where the fourth track comprises pulse locations
4, 9, 14, 19, 24, 29, 34, 39;

where the fifth track comprises pulse locations
0, 2, 5, 7, 10, 12, 15, 17, 20, 22, 25, 27, 30, 32, 35, 37;

where the sixth track comprises pulse locations
0, 1, 2, 3, 4, 6, 8, 10;

where the seventh track comprises pulse locations
5, 9, 13, 16, 19, 22, 25, 27;

where the eighth track comprises pulse locations
7, 11, 15, 18, 21, 24, 28, 32;

where the ninth track comprises pulse locations
12, 14, 17, 20, 23, 26, 30, 34;

where the tenth track comprises pulse locations
29, 31, 33, 35, 36, 37, 38, 39;

where the eleventh track comprises pulse locations
0, 1, 2, 3, 4, 5, 6, 7;

where the twelfth track comprises pulse locations
8, 9, 10, 11, 12, 13, 14, 15;

where the thirteenth track comprises pulse locations
16, 17, 18, 19, 20, 21, 22, 23;

where the fourteenth track comprises pulse locations
24, 25, 26, 27, 28, 29, 30, 31; and where the fifteenth track comprises pulse locations
32, 33, 34, 35, 36, 37, 38, 39.

23. The speech coding system of claim 1, where the plurality of subcodebooks comprises a Gaussian subcodebook.

24. The speech coding system of claim 23, where the Gaussian subcodebook generates a Gaussian codevector.

25. The speech coding system of claim 23, where the at least one codevector is selected using criterion values calculated without storing a square array and its transform.

26. The speech coding system of claim 25, where the first subcodebook comprises a first track and a second track, where the first pulse is selected from the first track and the second pulse is selected from the second track; and where the second subcodebook comprises a third track, a fourth track, and a fifth track, where the third pulse is selected from the third track, the fourth pulse is selected from the fourth track, and the fifth pulse is selected from the fifth track.

27. The speech coding system of claim 26, where the first track comprises pulse locations
0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79;

where the second track comprises pulse locations
0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79;

where the third track comprises pulse locations
0, 5, 10, 15, 20, 25, 30, 35, 40, 45, 50, 55, 60, 65, 70, 75;

where the fourth track comprises pulse locations
$Pos_1-7$, $Pos_1-5$, $Pos_1-3$, $Pos_1-1$, $Pos_1+1$, $Pos_1+3$, $Pos_1+5$, $Pos_1+7$:

and where the fifth track comprises pulse locations
$Pos_1-6$, $Pos_1-4$, $Pos_1-2$, $Pos_1$, $Pos_1+2$, $Pos_1+4$, $Pos_1+6$, $Pos_1+8$; and where the fourth and fifth tracks are dynamic, relative to $Pos_1$ which is the determined position of the third pulse, and limited within the subframe.

28. The speech coding system of claim 26, where the pulse locations of the fourth track and the fifth track each have a relative displacement from a determined location of the third pulse.

29. The speech coding system of claim 28, where the relative displacement comprises 3 bits and the location of the third pulse comprises 4 bits.

30. The speech coding system of claim 25, where the speech processing circuitry uses one of the criterion values to select one of subcodebooks to provide one of the codevectors.

31. The speech coding system of claim 30, where the one of the criterion values is further based upon at least one adaptive weighting factor.

32. The speech coding system of claim 31, where the at least one adaptive weighting factor is selected from the group consisting of a pitch correlation, a residual sharpness, a noise-to-signal ratio, and a pitch lag.

33. The speech coding system of claim 1, where the speech processing circuitry comprises at least one of an encoder and a decoder.

34. The speech coding system of claim 1, where the speech processing circuitry comprises at least one digital signal processor (DSP) chip.

* * * * *